United States Patent [19]
Engdahl et al.

[11] Patent Number: 5,452,420
[45] Date of Patent: Sep. 19, 1995

[54] INTELLIGENT NETWORK INTERFACE CIRCUIT FOR ESTABLISHING COMMUNICATION LINK BETWEEN PROTOCOL MACHINE AND HOST PROCESSOR EMPLOYING COUNTER PROPOSAL SET PARAMETER NEGOTIATION SCHEME

[75] Inventors: Jonathan R. Engdahl, Saline; Shawn L. Adams, Ann Arbor, both of Mich.

[73] Assignee: Allen-Bradley Company, Inc., Milwaukee, Wis.

[21] Appl. No.: 879,732

[22] Filed: May 6, 1992

Related U.S. Application Data

[63] Continuation of Ser. No. 383,492, Jul. 24, 1989, abandoned.

[51] Int. Cl.⁶ .................. G06F 13/14; G06F 13/24
[52] U.S. Cl. .................. 395/285; 395/309; 395/475; 395/891; 364/DIG. 1; 364/278.1; 364/240.8; 364/242.94
[58] Field of Search ... 364/200 MS File, 900 MS File; 395/425

[56] References Cited

U.S. PATENT DOCUMENTS

| | | | |
|---|---|---|---|
| 3,828,325 | 8/1974 | Stafford et al. | 395/275 |
| 4,093,981 | 6/1978 | McAllister et al. | 395/575 |
| 4,263,650 | 4/1981 | Bennett et al. | 364/200 |
| 4,441,162 | 4/1984 | Lillie | 364/900 |
| 4,443,850 | 4/1984 | Harris | 395/275 |
| 4,500,960 | 2/1985 | Babecki et al. | 395/325 |
| 4,924,456 | 5/1990 | Maxwell et al. | 370/32 |
| 4,933,846 | 6/1990 | Humphrey et al. | 364/200 |
| 4,942,540 | 7/1990 | Black et al. | 364/514 |
| 5,063,494 | 11/1991 | Davidowski et al. | 395/800 |

FOREIGN PATENT DOCUMENTS 0229700 7/1987 European Pat. Off. .

OTHER PUBLICATIONS

Mano, Computer Systems Architecture, 2nd Edition, 1982, pp. 403–473.

Primary Examiner—David L. Robertson
Assistant Examiner—Matthew M. Kim
Attorney, Agent, or Firm—Quarles & Brady

[57] ABSTRACT

A communications interface circuit couples a host processor to a pair of serial communications links. During power-up the interface circuit negotiates a set of operating parameters with the host processor through a shared memory to establish the optimal conditions under which message data is to be exchanged between the serial communications links and the host processor.

9 Claims, 11 Drawing Sheets

SYSTEM CONTROLLER

REMOTE I/O
SCANNER MODULE

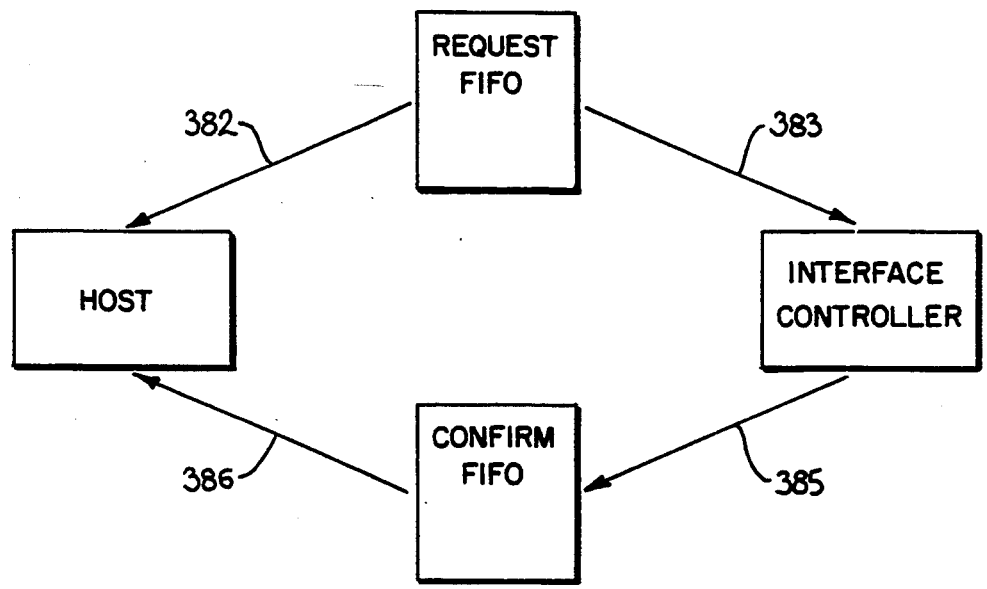
FIG. 13
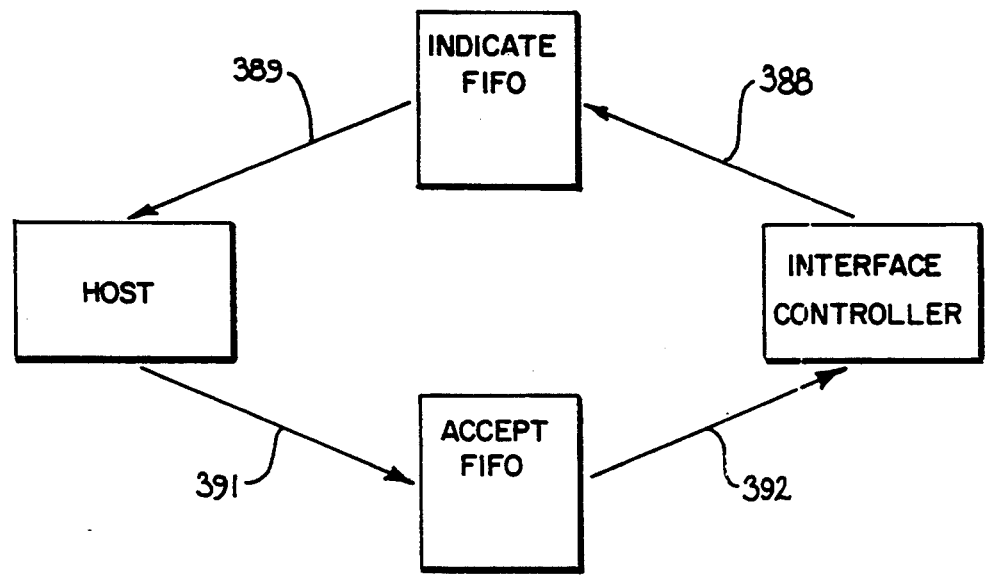
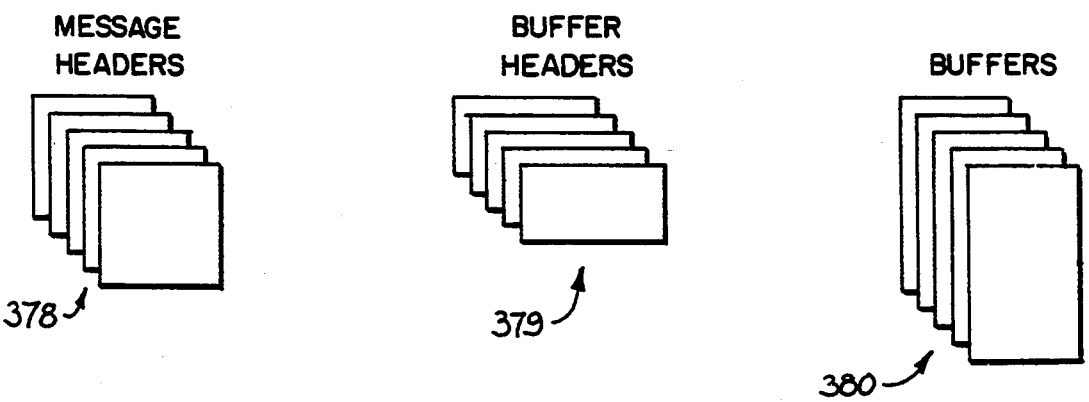

INTELLIGENT NETWORK INTERFACE CIRCUIT FOR ESTABLISHING COMMUNICATION LINK BETWEEN PROTOCOL MACHINE AND HOST PROCESSOR EMPLOYING COUNTER PROPOSAL SET PARAMETER NEGOTIATION SCHEME

This application is a continuation of application Ser. No. 383,492, filed Jul. 24, 1989, now abandoned.

BACKGROUND OF THE INVENTION

The field of the invention is serial communications networks and, particularly, interface circuits for connecting digital processors to serial communications networks.

There are numerous serial communications networks found in businesses and in factories. In the business environment, for example, local area networks sold under the trademark "Ethernet" link personal computers, display terminals, minicomputers, mainframe computers, printers and disk drives together into a system in which data may be transferred rapidly between its components. Similarly in the factory environment, local area networks sold under the trademark "MAP" link together cell controllers with display terminals, minicomputers, mainframe computers, computer aided design systems, computer aided manufacturing systems, computer aided engineering stations and disk drives. The types of serial communications networks have proliferated, and while efforts have been made to standardize communications in certain environments, there currently are hundreds of different networks in use and the number continues to grow.

When designing digital processors for use in a commercial environment, one must select a strategy for connecting that processor to serial communications networks. For example, where the processor has a backplane, such as "VME BUS" or "MULTIBUS", a circuit board for that backplane may be designed for each communications network. A variety of processor circuit boards and communications interface boards can be designed for the backplane and used together in any combination. On the other hand, where the digital processor does not employ a backplane, the interface to the communications network may be constructed as an integral part of the digital processor. In such case, each digital processor must be designed and constructed to operate on a particular communications network, and if many networks are encountered, a processor with integral interface circuit must be offered for each network. In other words, if a manufacturer offers a series of three digital processors of varying power and capability, and those processors must operate on three different communications networks found in their environment, then six circuit board products must be offered if a common backplane architecture is used, or nine different products must be offered if the communications interface is an integral part of the processor.

Where the manufacturer offers a wide variety of digital processor products of varying architectures and numerous communications networks are encountered in the environment in which those processors are used, difficult choices must be made. For example, the Allen-Bradley Company, assignee of the present application, manufactures small, inexpensive programmable controllers such as those disclosed in U.S. Pat. No. 4,504,927, and programming terminals such as that disclosed in U.S. Pat. No. 4,527,250, which do not employ a backplane. They also offer medium sized programmable controllers such as those disclosed in U.S. Pat. No. 4,443,865 that employ one backplane, large programmable controllers such as that disclosed in U.S. Pat. No. 4,442,504 that employ another backplane, numerical controllers such as that disclosed in U.S. Pat. No. 4,228,495 that employs yet other backplanes, and cell controllers such as that disclosed in U.S. Pat. No. 4,831,582 filed on Nov. 7, 1986, which employs still another backplane. Obviously, it is not commercially feasible to provide communications interface modules or circuits for each of these processor products and for each of the communications networks that may be encountered by them in the factory.

SUMMARY OF THE INVENTION

The present invention relates to an intelligent communications interface circuit which enables a serial communications network to be connected to a wide variety of digital processor-based products. More specifically, the present invention includes a network access circuit which connects to a communications network and which communicates thereon to receive and transmit message data, a shared memory for storing message data to be transmitted by the network access circuit and for storing message data received by the network access circuit, a shared data bus and a shared address bus for coupling the shared memory to the network access circuit and to a host processor, and an interface controller coupled to the host processor, the shared memory and the network access circuit; the interface controller being operable to negotiate with the host processor to establish mutually acceptable hardware interface parameters.

A general object of the invention is to simplify and reduce the number of products required to interface a family of digital processor products to a variety of communications networks. The intelligent communications circuit can be built as an integral part of the processor, or it can be built as a separate circuit board or module which connects to the processor's backplane. The digital processor connects to the shared data and address buses and carries on the negotiation with the intelligent communications interface circuit. As a result of the negotiation, the hardware characteristics of each digital processor is made known to the interface circuit which adapts its operation accordingly. A single intelligent communications interface circuit can, therefore, be constructed for each communications network protocol and the circuit will automatically adapt to all of the digital processors in the family.

Another object of the invention is to reduce the cost of interfacing processors with communications networks. In addition to the reduction in design, manufacturing, sales and inventory costs brought about by the reduction in the number of separate products required to meet the market needs, economies of scale are also realized. For example, a custom integrated circuit may be employed as the network access means for a particular communications network protocol. This same circuit can be employed with all the processors in the family which are to be connected to that particular network protocol and thus a large enough number may be produced to justify the high initial tooling costs.

Yet another object of the invention is to simplify the design of a network interface between a processor and a particular network. The processor designer need only connect to the shared buses and provide the means for carrying on the negotiation. The intelligent communications interface circuit will automatically adapt its own operation to be compatible with the processor design.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 13 is a pictorial representation of the data structures stored in the channel A and channel B segments which form part of the memory map of FIG. 6.

DESCRIPTION OF THE PREFERRED EMBODIMENT

Figure 1:
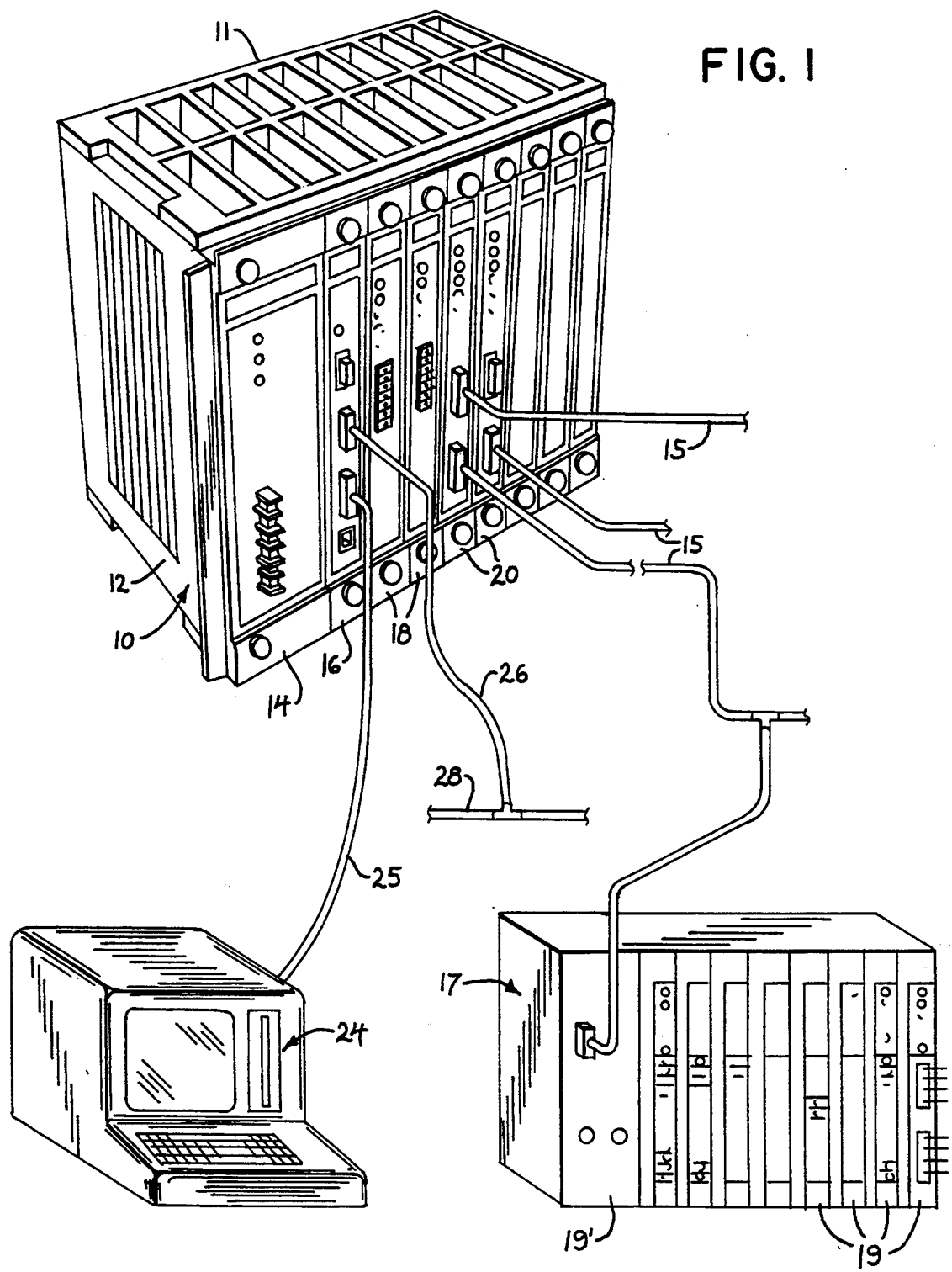
FIG. 1 is a pictorial drawing of a programmable controller system which employs the present invention.

Referring to FIG. 1, a programmable controller 10 is housed in a rack 12 which includes a series of slots that receive a plurality of printed circuit board modules. These functional modules connect to a mother board which extends along the back surface of the rack 12 to provide a backplane 11. The backplane 11 has a plurality of module connectors which are interconnected by a conductive pattern on the backplane. The backplane 11 provides a series of signal buses to which the modules connect. The rack 12 contains a power supply module 14, a system controller 16, a number of program execution processor modules 18 and a plurality of remote input/output (I/O) scanner modules 20. The physical construction of the rack 12 is disclosed in U.S. Pat No. 4,716,495 filed on Sep. 22, 1986, and assigned to the same assignee as the present invention.

Up to four remote I/O scanner modules 20 interface the controller 10 to external remote I/O racks 17 via serial I/O data links, such as link 15. Each remote I/O rack 17 has a plurality of local I/O modules 19 which are coupled to individual sensors and actuators on the controlled equipment. The local I/O modules 19 may take many forms and may include, for example, DC inputs or outputs, AC inputs or outputs, analog inputs or outputs, and open or closed loop positioning modules. The remote I/O rack 17 also contains an adapter module 19'; such as the one described in U.S. Pat. No. 4,413,319, which connects to the serial communications network 15 and couples message data between the I/O modules 19 and the network 15.

The system controller 16 is connected through cable 22 to a programming terminal 24, which is used to load the user programs into the programmable controller and configure its operation, as well as monitor its performance. The terminal 24 is a personal computer programmed to enable the user to develop the system's control programs. The control programs are downloaded into the programmable controller and the terminal 24 may be disconnected from the system controller 16 if further monitoring is not required. The system controller 16 may also be connected via a cable 26 to a local area network 28 over which it may receive data and programming instructions, as well as issue status information and report data to a central computer. This enables a central computer or central terminal to program and control the operation of a plurality of programmable controllers on a factory floor.

Figure 2:
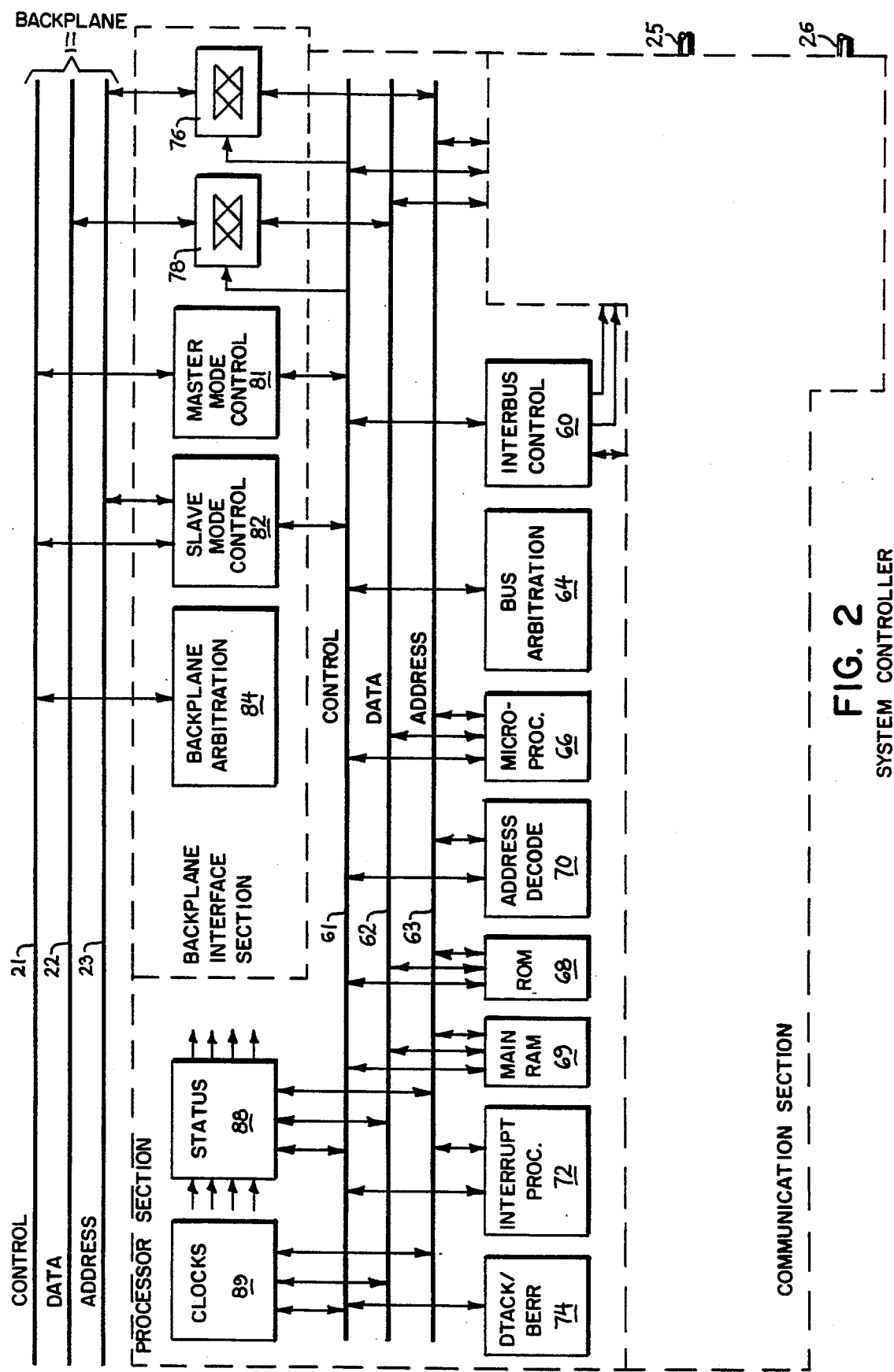
FIG. 2 is a block diagram of the system controller module which forms a part of the system of FIG. 1.

Referring particularly to FIG. 2, the system controller module 16 provides a communication interface for the programmable controller to external terminals and local area networks. The system controller 16 also performs system housekeeping functions, such as providing an indication of the system status and supervising access to the backplane 11. During normal operation of the programmable controller, the system controller 16 takes care of communication with the external devices that are connected to it, such as network 28 and the programming terminal 24. One of the significant tasks is communicating with the terminal 24 to provide information allowing the operator to monitor the system performance and to detect faulty sensors or actuators. Another task supervised by the system controller 16 is the exchange of data with a central computer or a peer programmable controller via the local area network 28. This enables the central computer to collect statistics from one or a number of programmable controllers regarding their operation.

The system controller module 16 connects to the backplane buses 21-23 and is divided into three sections: the backplane interface section; the processor section; and the communications section. The backplane interface section supervises the backplane access for all the rack modules and interfaces the controller module 16 itself to the backplane 11. The processor section executes a supervisory program for the controller 10. The communication section is primarily responsible for communicating with external terminal 24 through serial communications line 25 and with the local area network 28 through line 26.

Referring still to FIG. 2, the processor section is linked together by a set of buses that comprise control lines 61, a sixteen bit data bus 62 and a twenty-three bit address bus 63. Access to these buses is controlled by an arbitration circuit 64. The processor section is built around a sixteen-bit microprocessor 66, such as a model 68010 manufactured by Motorola, Inc., which executes program code stored in read only memory 68. The 68010 microprocessor is essentially a memory mapped device and does not have any input/output lines directly connected to it. Therefore, its access to other components on the processor bus must be accomplished through issuing addresses on bus 63. The address sent from the microprocessor 66 is decoded in an address decode circuit 70 to produce the proper control signals for the accessed component. The processor section also contains an interrupt processor 72 which controls interrupts to the microprocessor 66 and provides the proper instruction address vectors.

A data transfer acknowledge and bus error (DTACK/BERR) circuit 74 is also connected to the processor control bus 61. Circuit 74 responds to signals from the various components in the processor section to acknowledge the completion of a data transfer and to issue bus error signals in the event of improper addressing or failure of data transfer. These signals are acted on by the microprocessor 66 which takes corrective action. The processor section also includes clock circuit 89 that contains the main system clock and a real time clock. A system status circuit 88 receives input signals related to the status of the entire system 10 and provides an indication of that status.

The main random access memory (RAM) 69 for the system controller 16 is also connected to the processor buses 61–63. The RAM 69 is a static memory which serves as the system memory for the entire controller 10. The main memory 69 can be directly accessed via the backplane 11 by other modules in the system without the intervention of the microprocessor 66.

Referring still to FIG. 2, the processor section of the system controller 16 interfaces with the backplane buses of rack 12 via a plurality of components that are coupled to both sets of buses. Specifically, the backplane data bus 22 is connected to the processor data bus 62 by a set of bi-directional data transmission gates 78 and the backplane address bus 23 is connected to the processor address bus 63 by another set of bi-directional gates 76. When the system controller 16 seeks to exercise control over the backplane 11 of the programmable controller 10, a master mode control circuit 81 responds to signals on the control lines of the processor bus 61 and issues the proper control signals over the backplane control bus 21 to access other modules within the rack 12.

When another module within the rack 12 seeks access to the system controller 16 in order to read the contents of main RAM 69, for example, the system controller becomes subordinate to the control of the backplane 11 by this other module. In this circumstance, a slave mode control circuit 82 within the system controller 16 responds to the address of the system controller that appears on the backplane address bus 23 and to control signals on the control lines of the backplane bus 21 which lead from the other module. In response, the slave mode control 82 issues signals to transmission gates 76 and 78 enabling the other backplane module to access the system controller 16. In this latter instance, the master mode control circuit 81 is in a dormant state. The two bus gates 76 and 78 receive enabling control signals from the master or slave mode control circuits 81 and 82 via the lines of control bus 61 depending upon the mode of backplane communication.

A backplane arbitration circuit 84 supervises access to the backplane 11 and resolves conflicting requests for access from the modules in the system. The backplane arbitration circuit 84 employs a rotating priority system for determining which of several modules simultaneously seeking access to the backplane will be granted such access. With the rotating priority system, each time that a module relinquishes control of the backplane 11, the order of priority shifts.

Figure 3:
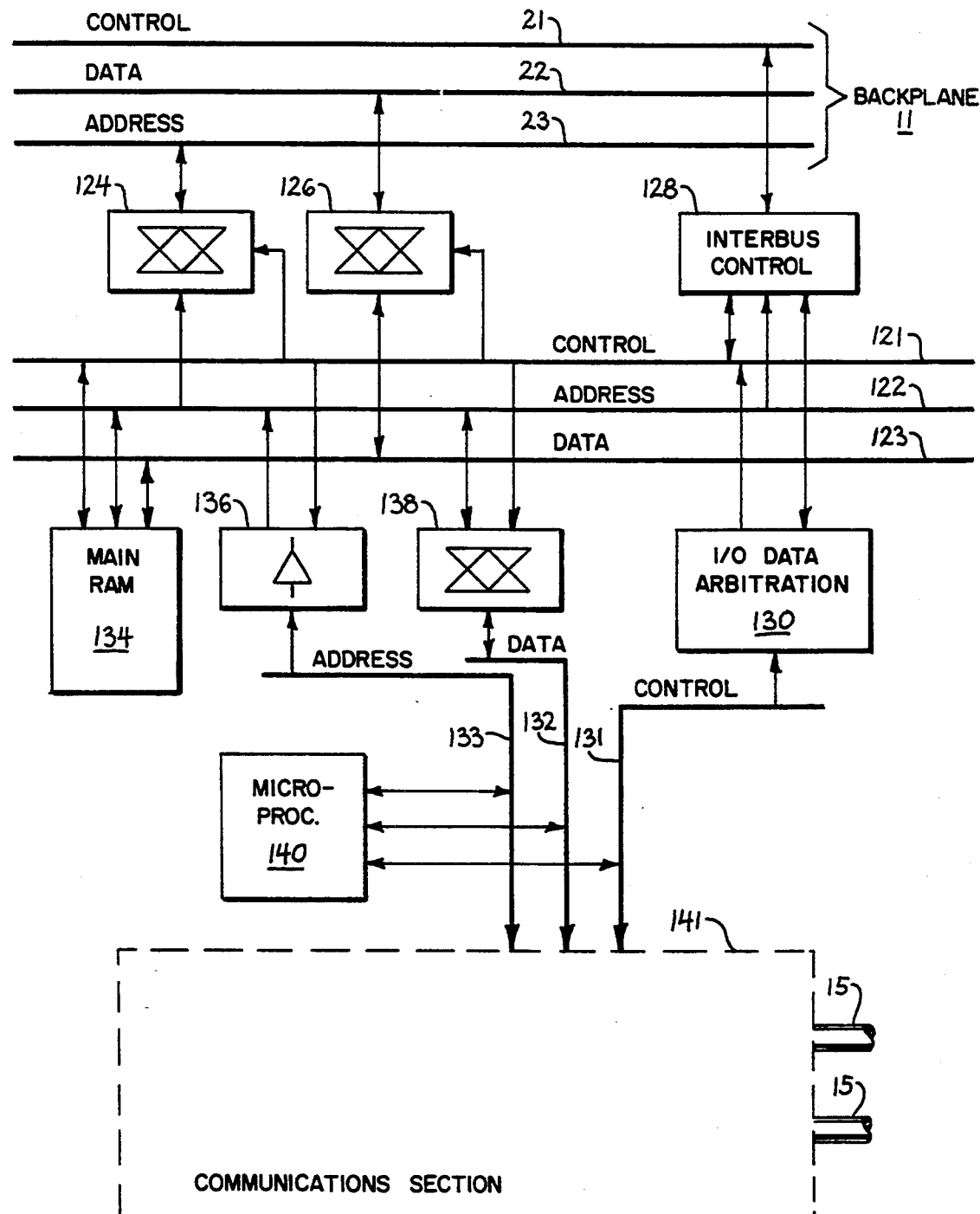
FIG. 3 is a block diagram of the remote I/O scanner module which also forms part of the system of FIG. 1.

The I/O scanner modules 20 gather input sensor data for use by the program execution processor modules 18. Referring to FIGS. 1 and 3, a remote I/O scanner module 20 couples the programmable controller 10 to one or more remote input/output racks 17 containing individual I/O modules 19 which interface the input devices or output devices to the programmable controller 10. Each scanner module 20 periodically requests input data pertaining to the status of the input devices connected to the remote I/O racks 17 and stores it in the module's input image table for reading by other controller modules, such as the processor modules 18. The scanner module 20 also contains an image table of output data that it receives from other controller modules, such as the processor modules 18. At regular intervals the updated output data in the scanner module's output image table is transferred to the respective remote input/output racks 17 to control the various actuators connected to these racks.

Each remote I/O scanner module 20 connects to the three backplane buses 21–23. The I/O scanner 20 contains two sets of internal buses: memory access buses 121–123 and microprocessor buses 131–133 are connected to the backplane 11 by a set of address bus gates 124 and a set of data bus gates 126. Both of these transmission gates are controlled by an inter-bus control circuit 128 which sends signals to the gates 124 and 126 via the memory control bus 121. A local random access memory, referred to as main RAM 134, is coupled to the three memory buses 121–123. It stores the input image table for the sensor information being input to the I/O scanner 20 from the remote I/O racks 17 and it also stores the output image table for the output data being output to the remote I/O racks 17.

The inter-bus control circuit 128 also sends control signals to an I/O data arbitration circuit 130 which resolves conflicting requests for access to the memory buses 121–123 from the backplane 11 and the microprocessor buses 131–133. Two sets of transmission gates, address gates 136 and bi-directional gates 138, interconnect the memory buses 121–123 to the microprocessor buses 131–133 and receive control signals from the I/O data arbitration circuit 130 via the memory control bus 121.

The operation of the remote I/O scanner 20 is controlled by an eight-bit microprocessor 140 which is connected to the three microprocessor buses 131–133. Microprocessor 140 is commercially available from Zilog, Inc. as the Z80 and it operates in response to a stored program to send message data to a communications section 141 from the main RAM 134 and to receive message data from the communications section 141. The communications section 141 couples message data between the microprocessor 140 and each of the serial links 15.

The above-described modules are typical of the environment in which the present invention is used. A host processor (such as microprocessor 66 or 140) which performs a number of functions must also communicate through one or more serial communication links or networks. The host processor exchanges message data with the communication network through a communications section which is responsible for executing the particular network protocol necessary to send or receive message data. The host processor is capable of reading data, including message data, from a memory which is shared with the communications section and it can write data to that shared memory. The exact manner in which these read and write functions are performed, however, and the amount of data transferred (i.e. 8, 16 or 32 bits) will vary considerably from one host processor to the next. The present invention is an intelligent communications interface circuit which can be used as the communications section and which automatically adapts to such variances by negotiating the operating parameters which are to be used with any particular host. A communications section for use on a particular local area network can, therefore, be constructed which will automatically adapt to a wide variety of host processors such as those described above.

Figure 4:
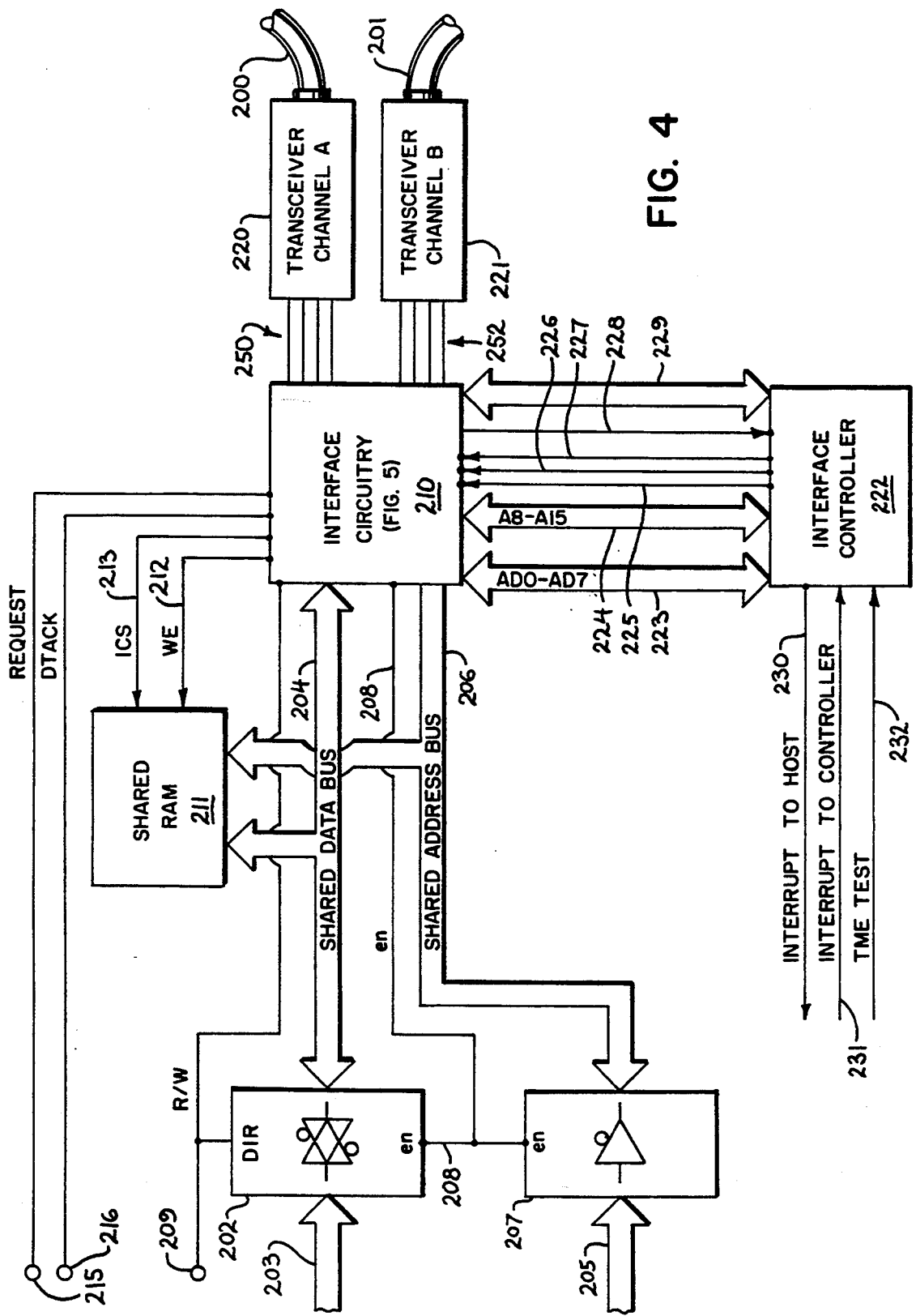
FIG. 4 is a block diagram of the intelligent communications interface circuit which is used in the modules of FIGS. 2 and 3.

Referring particularly to FIG. 4, the preferred embodiment of the communications interface circuit is designed to couple a host processor with either of two serial communications links 200 and 201. The host processor (not shown in FIG. 4) connects to the communications interface circuit through a set of bi-directional gates 202 which link the host's data bus 203 to a shared data bus 204. The host's address bus 205 is coupled to a 15-bit shared address bus 206 by a set of fifteen gates 207 that are enabled along with the data gates 202 when a logic low signal is received through a "en" control line 208. The host initiates a read or write cycle by asserting a "request" control line 215, and the interface circuit 210 acknowledges the request by asserting a DTACK control line 216 when access to the shared buses 204 and 205 is granted. The host's read/write control line 209 determines the direction of data transfer through the data gates 202.

The shared buses 204 and 206 connect to a shared random access memory (RAM) 211 which is controlled by the interface circuitry 210 through a WE control line 212 and an ICS control line 213. The interface circuitry 210 also connects to the shared buses 204 and 206 and it operates the en control line 208 to enable access to the shared RAM 211 by the host processor.

As will be explained in more detail below, the shared RAM 211 serves as a means for exchanging information, including message data, between the host processor and the communications interface. Message data may be written to the shared RAM 211 by either the host processor or the interface circuitry 210 and the other device can read that message data after being notified of its presence. Also, as will be described in detail below, data required by the communications interface circuit to operate properly with the host processor is stored in the shared RAM 211, as is data which configures the communications interface circuit to the particular application.

Referring still to FIG. 4, the interface circuitry 210 is an application specific integrated circuit (ASIC) which performs a number of functions. First, it arbitrates access to the shared RAM 211 and controls read and write cycles to the shared RAM 211. It also passes message data from the shared RAM 211 to either an A channel transceiver 220 or a B channel transceiver 221 and it passes message data from the transceivers 220 or 221 back to the shared RAM 211. It also permits an interface controller 222 to read data from the shared RAM 211 and write data to it.

The operation of the interface circuitry 210 is controlled by the interface controller 222 which is a programmed microcomputer, model "Super 8" manufactured by Zilog, Inc. The interface controller 222 connects to the interface circuitry 210 through an 8-bit data/address bus 223, and an 8-bit address bus 224 and a set of control lines. When a 16-bit address is applied to the buses 223 and 224, a signal is asserted on AS control line 225, and when 8-bits of data is applied to bus 223, a signal is asserted on DS control line 226. The direction of data transfer on bus 223 is determined by the logic state of a R/W control line 227. The above buses and control lines are driven by the interface controller 222, however, a number of control lines are driven by the interface circuitry 210. These include a WAIT control line 228 which places the interface controller 222 in a wait state, and a series of interrupt lines and flag lines which are indicated collectively at 229.

The interface controller 222 is also linked to the host processor by a set of control lines. These include an INTERRUPT TO HOST control line 230 which is asserted by the interface controller 222 and which signals the host processor that it should read certain data structures in the shared RAM 211. Likewise, the host processor can interrupt the interface controller 222 through an INTERRUPT TO CONTROLLER control line 231, which signals the interface controller 222 to read the shared RAM 211 for information from the host processor. Finally, a TME control line 232 may be asserted by the host processor to signal the interface controller 222 that it should enter into its test mode of operation.

Figure 5:
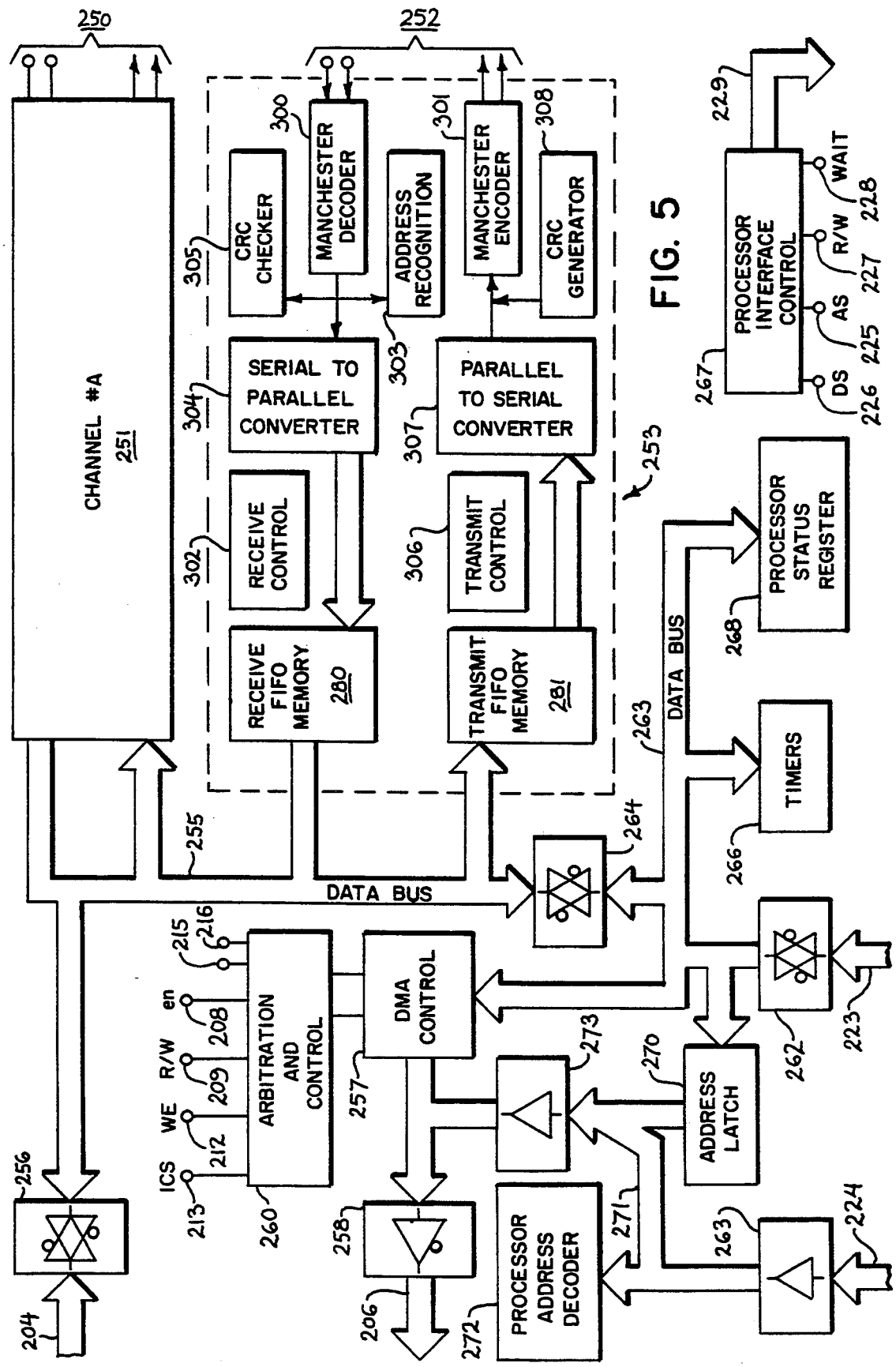
FIG. 5 is a circuit diagram of the network access circuit which forms part of the circuit of FIG. 4.

Referring particularly to FIGS. 4 and 5, the interface circuitry 210 links the transceivers 220 and 221 to the shared RAM 211 and the interface controller 222 to the shared RAM 211. The channel A transceiver 220 is connected through lines 250 to a channel A serial protocol machine 251, and the channel B transceiver 221 is connected through lines 252 to a channel B serial protocol machine outlined by dashed line 253. The serial protocol machines 251 and 253 are identical in construction and operation.

Message data to and from the serial protocol machines 251 and 253 is coupled to the shared RAM 211 through an 8-bit data bus 255 and a set of eight bi-directional data gates 256. A DMA control 257 actually carries out the transfer of message data to and from the shared RAM 211 by generating addresses on its shared address bus 206 through a set of fifteen address gates 258. Control of the shared buses 204 and 206 is determined by an arbitration and control circuit 260 which arbitrates requests from the host processor, from the interface controller 222 and from both the A and B channels of the DMA control 257.

Referring still to FIGS. 4 and 5, the interface controller buses 223 and 224 connect to the interface circuitry 210 through a set of eight bi-directional gates 262 and a set of eight address gates 263. When data is present on the bus 223 as signaled by the DS control line 226, the bi-directional gates 262 are enabled and the data is conveyed therethrough in the direction indicated by R/W control line 227. This data is applied to an 8-bit data bus 263, which in turn is coupled to the 8-bit data bus 255 by another set of eight bi-directional data gates 264. In this manner, data may be coupled to or from the shared RAM 211 to the data bus 263 and through gates 262 to the interface controller 222. Data on the bus 263 may also be conveyed to the DMA control 257 to enable the interface controller 222 to set the memory address which the DMA control will generate. It also couples to a set of timers 266 and processor status registers 268. The interface controller 222 may thus write data to the timers 266 which configure the serial protocol machines 251 and 253 to the particular timing requirements of the local area networks. The interface controller 222 may also write data to the registers 268 which control the operation of the interface circuitry 210 while the interface controller 222 is performing other functions. The interface controller 222 may also read from the processor status registers 268 to determine the state of the interface circuitry 210 at any moment in time. The contents of the processor status register 268 is provided in Table A.

TABLE A

Processor Status Registers

| | |
|---|---|
| 4 bits | tells manchester encoder how many valid bits it is to receive before indicating "valid manchester" |
| 1 bit | valid manchester signal available |
| 1 bit | carrier detected |
| 1 bit | Fault detect |
| 8 bit | station address |
| 4 bit | state of receive FIFO fullness |
| 3 bit | number of preamble flags sent before a packet |
| 8 bit | number of bit times to hold transmitter after command to transmit |
| 1 bit | transmitter is busy |
| 1 bit | receiver busy |

Receiver syndrome register - cause of a "bad packet" interrupt to microprocessor.

receive FIFO overflow
manchester code lost
packet too short
packet too long
abort message received
CRC bad
read from empty receive FIFO Transmit syndrome register - transmit FIFO underflow (empty)
too many opening flags
write to full transmit FIFO When the interface controller 222 asserts an address on its bus 223, as indicated by its AS control line 225, that address is latched at address latch 270. Subsequently, when the upper eight bits of the address are asserted on bus 224, the complete 16-bit address is applied to an address bus 271. This address is decoded by decoder 272 to enable one of the devices connected to the data bus 263. In addition, if the shared RAM 211 is addressed, the decoder 272 generates a request to the arbitration and control circuit 260 and a wait signal is produced for the interface controller 222 by a processor interface control 267 through control line 228. When access is granted, this wait signal is removed and a set of address gates 273 are enabled to allow the address produced by interface controller 222 to be coupled to the shared address bus 206 through gates 258.

Through the above described buses and gates, the interface controller 222 has full access to the shared RAM 211 where it can exchange information with the host processor. In addition, the interface controller 222 can configure the operation of the serial protocol machines 251 and 253, control their operation, and monitor their operation.

Referring still to FIG. 5, the serial protocol machines 251 and 253 handle the bit oriented protocol structure used by the local area networks to which they connect. They are sometimes referred to as an HDLC engine which transmit and receive the packeted information in the serial format of the local area network protocol. Each provides the flags, zero insertion and deletion, and CRC checking and generation. Each serial protocol machine 251 and 253 is divided into a receive section which transfers all data bytes received at a manchester decoder 300 to the receive FIFO memory 280, and a transmit section which transmits all data bytes loaded into the transmit FIFO memory 281 through to a manchester encoder 301.

The receive section is operated by a receive control 302 that connects to each of its functional elements. As a data packet is received through the manchester decoder 300, the address field therein is checked by circuit 303 as it is transferred serially to a serial-to-parallel converter 304. If the address does not correspond to the local address of this station, the data packet is ignored. Otherwise, the data packet is converted to 8-bit bytes of data by the serial-to-parallel converter 304 and the bytes of data are stored in the receive FIFO memory 280. The last two bytes prior to the packet's closing flag is a cycle redundancy checking (CRC) number which is compared with the number produced by a CRC checker 305. If the numbers are the same, accurate transmission of the data packet has occurred and it is passed onto the receive FIFO memory 280. An interrupt of the interface controller 222 (FIG. 4) is produced to indicate that a data packet has been received. If the CRC bytes indicate an error in transmission, the CRC checker 305 generates an interrupt to the interface controller 222 and error bits are set in the receive syndrome register to inform the interface controller 222 of the problem.

The transmit section is operated by a transmit control 306 that connects to each of its functional elements. The transmit section is commanded by the interface controller 222 to send a data message stored in the transmit FIFO memory 281. The transmitter automatically begins sending the preamble bits of the data packet through the manchester encoder 301 and data bytes are then read from the transmit FIFO memory and applied to a parallel-to-serial converter 307. The data is converted to a serial bit stream which is fed to the manchester encoder 301 for transmission. A CRC generator 308 monitors all bits in the transmitted data packet and when the last data bit has been sent, the CRC generator 308 produces a 16-bit CRC number which is used as described above to check the integrity of the data packet when it is received at another station.

There are many architectures which may be employed to implement the serial protocol machines 251 and 253, and their precise design is not the subject of the present invention. For example, many of their functions may be performed by universal, asynchronous receiver/transmitters (UARTs) which are commercially available in integrated circuit form. The same is true of the manchester encoders and decoders and the FIFO memories. As indicated above, however, these functional elements of the serial protocol machines 251 and 253 are implemented in the preferred embodiment as part of an ASIC which also includes the other functional elements shown in FIG. 5. Indeed, it is one of the objects of the present invention to enable this ASIC to be used in a wide variety of communications applications so that its design, development and tooling costs can be economically justified.

As indicated above, the shared RAM 211 stores data structures which enable the communications interface circuit to adapt to the particular host processor to which it connects and to exchange message data with that host processor. These stored data structures are illustrated generally in FIG. 6 and will now be discussed in more detail.

Figure 6:
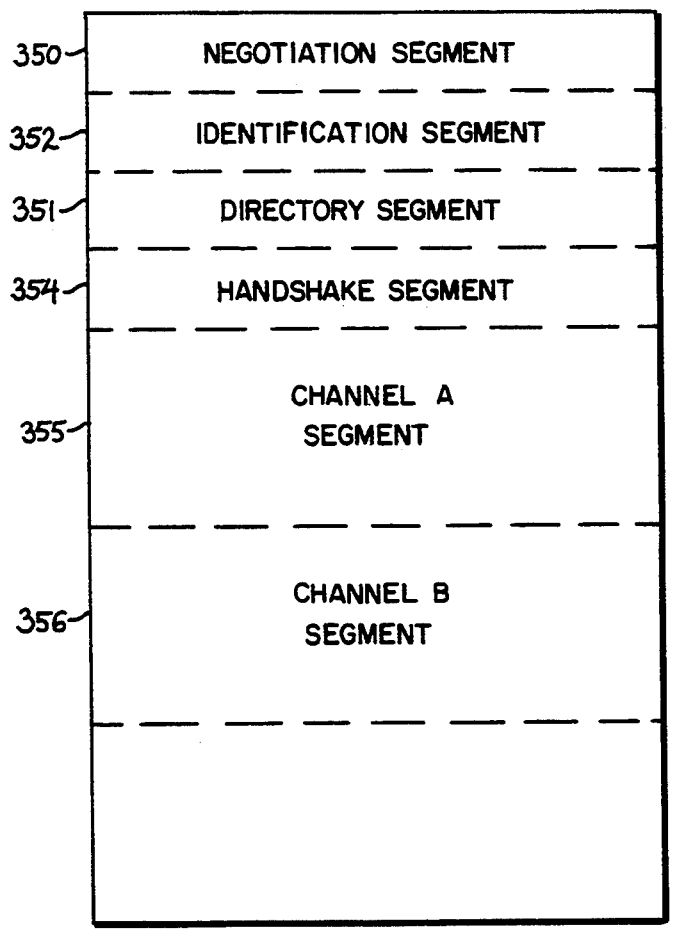
FIG. 6 is a map of the shared RAM which forms part of the circuit of FIG. 4.

Referring particularly to FIG. 6, the shared RAM 211 stores data in segments. The first segment 350 is a negotiation segment which contains 32 bytes of data that is used at power-up to negotiate the characteristics of the communications between the host and the communications interface circuit. This segment 350 will be described in more detail below.

The second segment is an identification segment 352 which contains information that indicates the series and revisions number of the communications interface circuit.

The third segment 351 is a segment directory that contains an array of segment descriptors that include the starting address of each segment in the shared RAM 211, the size of each segment, the type of segment, and the instance of the segment. The segment directory 351 is an index to the other segments in the shared RAM 211. The types of segments include:
0—negotiation segment
1—segment directory
2—identification segment
4—channel segment
5—interprocessor handshake flags
6—selection segment The instance indicates the number of the segment of a particular type. For example, there are two channel segments 355 and 356 in the preferred embodiment and these are distinguished by their instance number "0" and "1".

Figure 12:
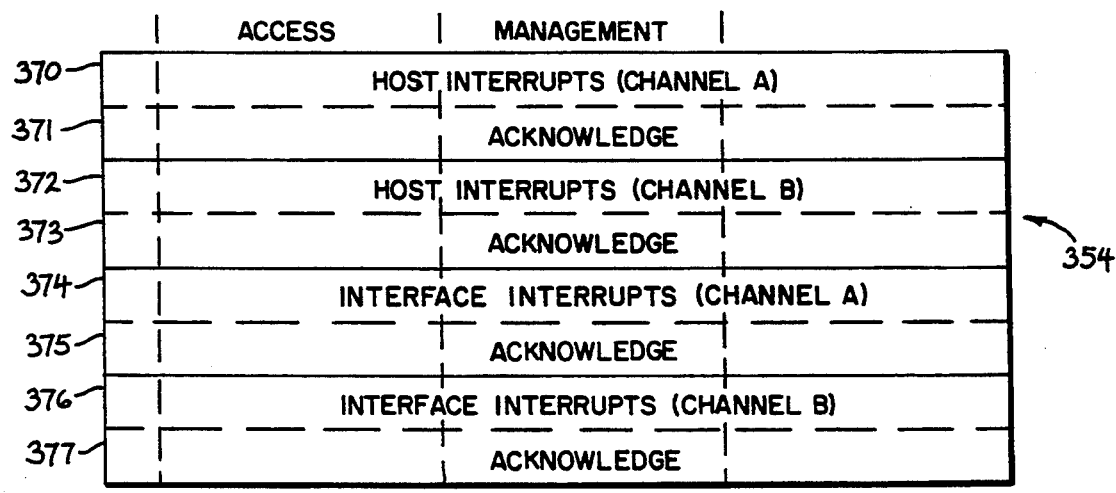
FIG. 12 is a map of the handshake segment which forms part of the memory map of FIG. 6.

Following the directory segment 351 is a handshake segment 354 which occupies eight 8-bit words per channel in the shared RAM 211. As shown in FIG. 12, the handshake segment 354 includes four words 370-373 which store flags that relate to interrupts from the host to the interface controller 222, and four words 374-377 which store flags related to interrupts from the interface controller 222 to the host. More specifically, a flag is toggled in word 370 by the host processor when it interrupts the interface controller 222. The interface controller 222 services the interrupt by reading these flags and determining which has been toggled. The first flag indicates that channel A is to be reset, the next four flags indicate that the respective four channel A access FIFO registers require service, and the next four flags indicate that the respective four channel A management FIFO registers require service. The interface controller 222 acknowledges the interrupt by toggling the corresponding flag in the word 371 and executing the routine required to service the interrupt. Words 372 and 373 in the handshake segment 354 are identical to the words 370 and 371, however, they relate to channel B.

The last four words 374-377 in the handshake segment 354 are organized in the same manner, however, the interrupt flags in words 374 and 376 are toggled by the interface controller 222 and the interrupts are serviced by the host. The host acknowledges the interrupt by toggling the corresponding flag in word 375 or 377 and it executes the appropriate interrupt service routine.

In summary, the handshake segment 354 operates as a means for multiplexing many interrupts from either the host or the interface controller 222 through a pair of interrupt lines. An interrupt is signaled when the corresponding bits in word pairs 370-371, 372-373, 374-375 and 376-377 are in the opposite state. The host can only toggle its own flags and the interface controller 222 can only toggle its flags. Both can read all of the flags, however, and either can determine if an interrupt has been requested and if a requested interrupt has been serviced. Using this technique, neither processor need be locked out of the shared RAM 211 at any time.

Referring still to FIG. 5, the next two segments in the shared RAM 211 store data associated with messages that are conveyed through the A channel and the B channel of the interface circuitry 210 (FIG. 5). More specifically, segment 355 stores the FIFOs, message headers, buffer headers and buffers associated with communications through channel A, and segment 356 stores similar data structures for communications through channel B. Since the two segments 355 and 356 are similar, only one will be described in detail.

Referring particularly to FIG. 13, each message which is conveyed between the host and the interface controller 222 through the shared RAM 211 is comprised of a message header, one or more buffer headers, and a data buffer associated with each buffer header. The message headers are illustrated at 378 as a linked set of data structures, and each message header stores the following information:
NEXT—pointer to the next buffer header associated with this message;
SERVICE—the service performed by this message;
PRIORITY—the priority level of this message where the protocol supports different priorities;
STATUS—the result of the transmission
   0=confirmed delivery
   1=confirmed nondelivery
   2=unconfirmed delivery
   3=unconfirmed nondelivery;
REASON—error code which indicates the cause of a failure;
DESTINATION ADDRESS
COUNT—number of bytes required by destination address;
DESTINATION NETWORK
ADDRESS—the destination of this message;
SOURCE ADDRESS
COUNT—the number of bytes needed to define source address;
SOURCE NETWORK
ADDRESS—the source of this message;
SAP TYPE—the type of service access point being used in this message;
DSAP—destination service access point number;
SSAP—source service access point number;
BUFFER HEADER
POINTER—address of the first buffer header associate with this message; and
TAG—user defined field.

The buffer headers are indicated in FIG. 13 at 379 as a set of linked data structures. Each buffer header stores the following information:
NEXT—pointer to the next buffer header associated with this message;
DATA—pointer to the buffer associated with this buffer header; and
SIZE—the number of data bytes in the associated buffer.

The buffers are indicated at 380 and each is a consecutive sequence of bytes associated with one of the buffer headers 379. Either the host or the interface controller 222 may form a message which is comprised of one or more of these data buffers 380 by storing the message data therein and then linking them together by their associated buffer headers 379. A message header 378 is then formed which identifies the first buffer header in this linked list of buffer headers 379.

Referring still to FIG. 13, if the host creates a message it stores a pointer to the header for that message in a REQUEST FIFO 381 as indicated by arrow 382. The REQUEST FIFO 381 is an array of such pointers preceded by the following stored in format ion:

NEXT IN—host index to the next available location in the FIFO where a message header pointer can be stored;

NEXT OUT—interface controller index to the next message pointer to be read and processed;

WRAP MASK—the two indexes wrap using this field; and

IFLAG NUMBER—interrupt flag bit number used by this FIFO.

When the interface controller 222 is interrupted, it reads the next message pointer out of the REQUEST FIFO 381 as indicated by arrow 383, and it reads the indicated message header 378 and the associated data 380 indicated by the buffer headers 379 to form a message. It confirms that the message has been received and processed by writing the pointer for the same message header into a CONFIRM FIFO 384 as indicated by arrow 385. The FIFO 384 is similar in structure to the FIFO 381, and when the host is interrupted, it reads the next message header pointer from the confirm FIFO 384 as indicated by arrow 386. The host then reads the indicated message header from the shared RAM 211 to confirm that the message which it initiated has been processed.

Similar data structures exist for messages initiated by the interface controller 222. Referring still to FIG. 13, when the interface controller 222 receives a message on the network, it stores the message data in the shared RAM 211 in available buffers 380 and the message header in an available message header 378. It then stores a pointer to the message header 378 in an indicate FIFO 387, as indicated by arrow 388, and interrupts the host. The host processor reads the next pointer in the indicate FIFO 387, as indicated by arrow 389, and the header and message data are read from the shared RAM 211. The host processor then writes a pointer to an accept FIFO 390, as indicated by arrow 391, and it interrupts the interface controller 222. The interface controller 222 reads the pointer from the accept FIFO 390 to confirm that the message has been accepted by the host as indicated by arrow 392.

Referring again to FIG. 12, the handshake segment includes interrupt flags for each of the four FIFOs 381, 384, 387 and 390. More specifically, the host interrupt in the word 370 includes four access flags which correspond to the four channel A FIFOs and word 372 includes four channel B FIFOs. Similarly, the interface controller word 374 includes four access flags which correspond to the four A channel FIFOs and the interface controller word 376 includes four access flags which correspond to the four B channel FIFOs. These flags enable the interrupted processor to promptly read the appropriate FIFO when it is interrupted by the other processor.

The channel segments 355 and 356 in the shared RAM 211 (FIG. 7) also store data structures associated with network management functions. These include four management FIFOs and associated message headers, buffer headers and buffers (not shown in the drawings) which operate as described above. In addition, there are four management interrupt flags in each of the words 370–377 of the handshake segment 354 (FIG. 12) which enable the host and interface controller 222 to promptly service the management FIFOs.

The present invention is particularly directed to the manner in which the communications interface circuit adapts to the particular host with which it is connected. When the system is powered up, the communications interface circuit carries out a negotiation procedure and then a configuration procedure under the direction of a program stored in the interface controller 222. Before describing this program in detail, the negotiation and configuration procedures will be described in general terms.

Negotiation is performed once after reset, or power-up and it affects all channels. A fixed list of parameters must be negotiated between the communications interface circuit and the host. Once a parameter has been successfully negotiated, it has immediate and remaining impact on the host/communications interface circuit interface. All interrupts from the communications interface circuit to the host during negotiation are channel independent. Also during the negotiation phase the host accesses the shared RAM 211 directly and does not use the segment table 351. This is the only instance in which this occurs.

Each parameter is negotiated in the following manner: the communications interface circuit will initiate a negotiation by placing its preference for a parameter in a defined location in the shared RAM 211; then the host is interrupted by pulsing the INTERRUPT TO HOST line 230. If the host offers a counter-proposal, it will place its proposal in the same location, and interrupt the communications interface circuit by pulsing INTERRUPT TO CONTROLLER line 231. This completes one two-phase cycle. The communications interface circuit will then initiate another proposal, and the cycle will repeat. At any time the host can accept the communications interface circuit's most recent proposal by pulsing INTERRUPT TO CONTROLLER line 231 without offering a counter-proposal. At the completion of this last handshake cycle, the negotiation of the parameter is complete. If, after several cycles, the host determines that the communications interface circuit is incompatible, it may cease negotiations. The host will then fault and report the error.

There are a fixed number of negotiations that will be initiated by the communications interface circuit upon power-up. For each parameter, a sequence of proposed values are defined so as to prevent an indefinite loop of non-matching proposals.

Figure 7:
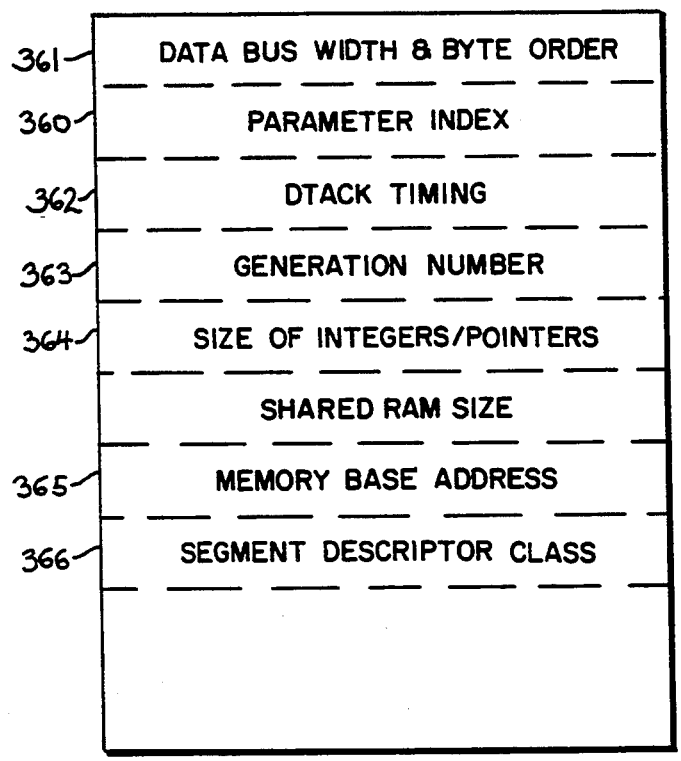
FIG. 7 is a map of the negotiation segment which forms part of the memory map of FIG. 6.

The negotiated parameters are shown in FIG. 7. Each parameter is placed in a unique location in the negotiation segment 350, and it has a predefined size. A parameter index 360 of the negotiation segment 350 is an index that indicates the parameter currently under negotiation. The current parameter's location is easily calculated by adding the value of the parameter index 360 to the base address of the shared RAM 211.

The first parameter to be negotiated is the width of the host data bus and the order in which high and low order data bytes are stored in the host's memory. This parameter enables the communications interface circuit to adapt to host processors of different sizes and types. For example, the Motorola 68010 microprocessor 66 employed in the system controller of FIG. 2 described above produces 16 bits of data and it is a high order byte first architecture, whereas the Zilog Z80 microprocessor 140 in the I/O scanner module of FIG. 3 produces 8 bits of data and is a low order byte first architecture.

Two bits in a data bus width and byte order word 361 determine bus size, and two bits determine byte order as follows:

Bus Size Values
00—8 bit data bus (default)
01—16 bit data bus
10—32 bit data bus
11—reserved Byte Order Values
00—low order byte stored in low address, high order byte stored in high address (default value);
01—low order byte stored in high address, high order byte stored in low address
10—reserved
11—reserved The negotiation of this parameter differs from the others in that the parameter values are placed into the first byte of interface RAM 211, and the parameter index 360 is not used. The first byte is the location which is addressed when all address lines in the bus 206 are low. This location is common regardless of the negotiated bus width or byte ordering.

The communications interface circuit initiates this negotiation by proposing its own bus size (8 bits in the preferred embodiment). If the host has a smaller data bus width, it counters with its bus size. If the host's bus is wider, it accepts the communication interface circuit's proposal. In any case, when this negotiation is completed, the smaller of the two data bus widths is used and the device with the larger data bus width must accommodate to the smaller bus width. For example, if the preferred embodiment of the communications interface circuit is used with a host processor which has a 16 bit data bus, the host processor will accommodate the smaller bus size by applying data only to its eight least significant data bus leads which connect to the bi-directional gates 202 (FIG. 4).

The next parameter to be negotiated is DTACK timing. This parameter is stored as a single bit in a DTACK TIMING word 362 in which a "0" indicates that the communications interface circuit will produce a DTACK signal shortly after it presents data on the shared data bus 204 and a "1" indicates that the DTACK signal will be presented earlier in order to accommodate hosts which perform memory read cycles faster. Selection of this parameter enables the communications interface circuit to adapt to host processors with different memory read cycles.

The next parameter to be negotiated is a one byte number that indicates the version, or generation number that is supported by the communications interface circuit. The communications interface circuit proposes the highest generation it supports (zero being the lowest). The host only counter-proposes with a lower generation number. However, it is not a requirement that the communications interface circuit support any previous generation, and if the host and communications interface circuit determine an incompatibility, negotiation ends and the communications interface circuit waits to be reset. The negotiated generation number is stored at 363 in the negotiation segment 350.

The fourth parameter to be negotiated indicates the size of integers and pointers produced by the host processor. This is a single bit stored at 364 in the negotiation segment 350, in which a "1" indicates 32-bit pointers and integers and the default value of "0" indicates 16-bit pointers and integers.

The next parameter indicates the base, or starting address, of the shared RAM 211. It occupies two bytes in the negotiation segment 350 at 365. The communications interface circuit proposes a base address from $0000_{16}$ to $FF00_{16}$. Any counter-proposal within that same range is accepted. Any counter-proposal not within the acceptable range causes the communications interface circuit to renegotiate. If a host requires a base address greater than $FF00_{16}$, it negotiates a base address of $0000_{16}$ and provides basing independent of the communications interface circuit.

The final parameter to be negotiated is the class of segment types which the host and the communication interface circuit will support. As indicated above, there are certain segment types in the shared RAM 211 which must be present to properly operate, and there are certain types which are associated with particular communication protocols. The communications interface circuit proposes the highest class of the segment descriptor. The host only counter-proposes with a lower class. However, it is possible that a communications interface circuit will only support a subset of the classes defined, and therefore, when a host counter-proposes with a lower class of the segment description, the communications interface circuit may counter the counter-proposal with an even lower class. The number of iterations for the negotiation to complete is fixed since every communications interface circuit is required to support class 0. The result is stored at 366 in the negotiation segment 350.

Negotiation is then terminated by a dummy negotiation cycle. The communications interface circuit sets the parameter index 360 to $FF_{16}$ and interrupts the host. The host interrupts the communications interface circuit and negotiation terminates. No data is actually transferred during this final cycle.

As indicated above, the primary function of the interface controller 222 is to relay messages between the shared RAM 211 and the interface circuitry 210 (FIG. 4). It performs this function and its other functions under the direction of programs which are stored in its internal read-only memory (not shown in the drawings). A number of these programs are interrupt driven and include a service routine which is executed when an interrupt is received from the host through line 231, and service routines which are executed when an interrupt is received from the A channel or the B channel of the interface circuitry 210. The main program which is executed by the interface controller 222, however, is illustrated in FIG. 8, and will now be described in more detail.

Figure 8:
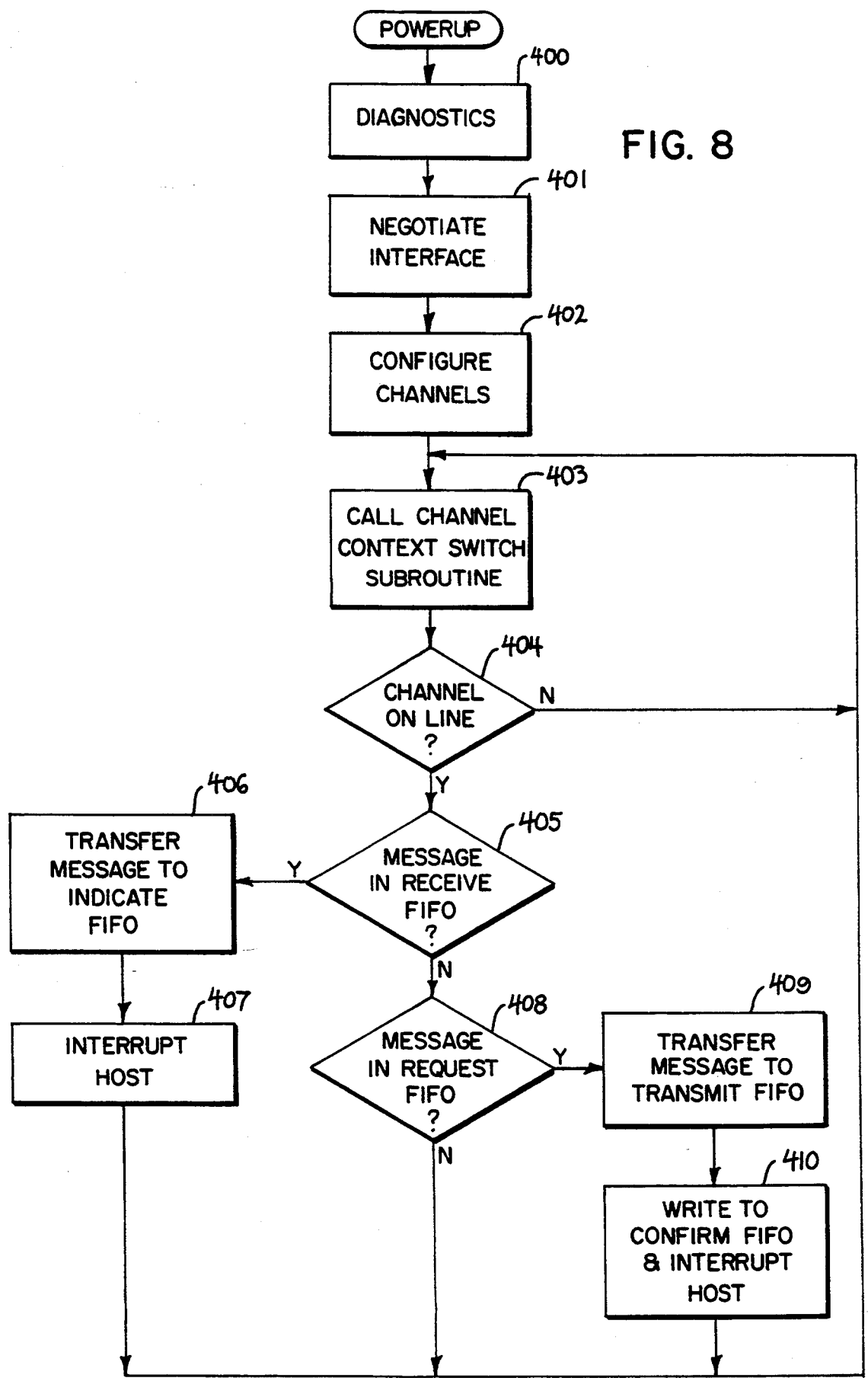
FIG. 8 is a flowchart of the program executed by the interface controller of FIG. 4.

Referring particularly to FIG. 8, when the interface controller 222 is powered up, or physically reset, a set of instructions indicated by process block 400 are executed to perform diagnostic functions. For example, the integrity of the shared RAM 211 is thoroughly checked. Following this, a set of instructions indicated by process block 401 are executed to negotiate a set of parameters which determine how the interface controller 222 and the host will communicate with each other through the shared RAM 211. This section of the program is described in greater detail below with reference to the flow chart of FIG. 9.

Following negotiation, each of the two channels is configured as indicated by process block 402. Each physical channel defaults to a set of predefined access and protocol selections although other selections can also be made. More specifically, within each channel segment 355 and 356 of the shared RAM 211 (FIG. 6) are select segments (not shown) which can be read by the host and used to select operating parameters which are different than the default values. For example, each channel can be set for any one of four "access" types: (1) an active node on a local area network; (2) an inactive node on a local area network; (3) a scanner or an adaptor on a serial I/O link; or (4) a bridge between two local area networks. With each of these access types there is a menu which defines the various protocols that can be selected by the host, and each selectable protocol may have values of operating parameters for the protocol (i.e. baud rate, parity, etc.). When the configuration of each channel has been completed, the channel becomes operational, or "on line".

Referring still to FIG. 8, after configuration is completed, each physical channel is then alternately serviced. This is accomplished by calling a subroutine indicated at 403 which switches the channel context. This context switch involves saving the values of microcomputer registers and loading the register values for the other channel. A check is then made at decision block 404 to determine if the channel is operational, and a check is then made at decision block 405 to determine if any incoming messages are available in the channel's receive FIFO 280 (FIG. 5). If so, the message is read from the receive FIFO 280 and written to an unused buffer 380 in the shared RAM 211 as indicated at process block 406. The corresponding buffer headers 379 and message header 378 are created and a pointer to the message header 378 is stored in the next entry of the indicate FIFO 387 (FIG. 13). As indicated at process block 407, the proper flag in the handshake segment is then toggled and the host is interrupted to service the incoming message.

If no incoming message is present as determined at decision block 405, a check is made at decision block 408 to determine if messages have been posted for transmission in the shared RAM 211 by the host. If so, the pointer in the request FIFO 381 is read and the indicated message header 378, buffer headers 379 and buffers 380 (FIG. 13) are transferred from the shared RAM 211 to the channel's transmit FIFO 281 (FIG. 5) as indicated at process block 409. The same message header pointer is then written to the confirm FIFO in the shared RAM 211 and the host is interrupted at process block 410 to indicate that the message has been processed.

The interface controller 222 continuously cycles through this program with the context being switched between the two channels. Consequently, messages received at either channel are passed through to the host, and messages received from the host are passed through for transmission on the proper serial link.

Figure 9:
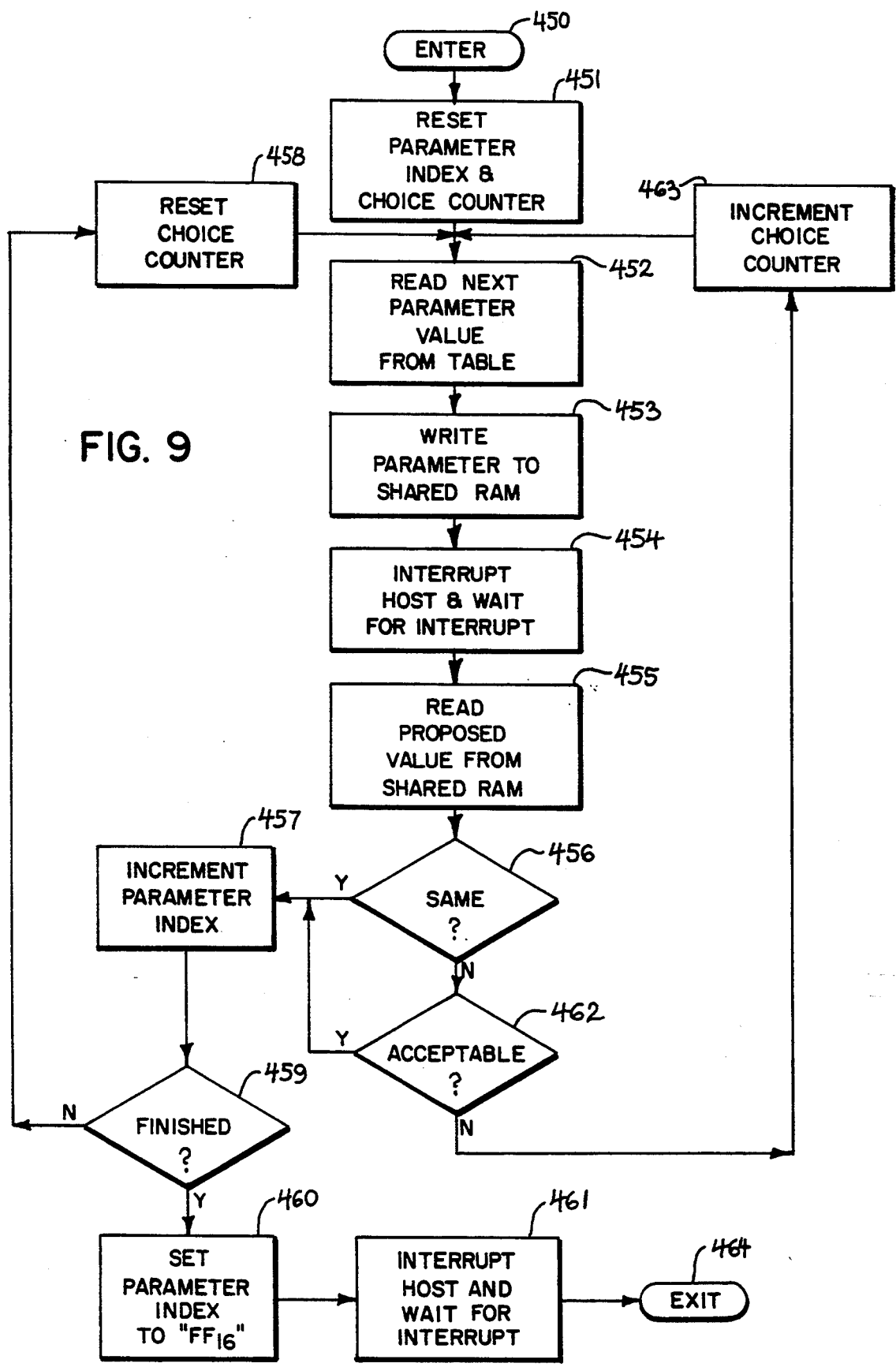
FIG. 9 is a flowchart of the negotiation process which forms part of the program of FIG. 8.

Referring particularly to FIG. 9, the negotiation process is initiated by the communications interface circuit under the direction of a stored program which is executed by the interface controller 222. This program is entered at 450 and a parameter index and a choice counter are reset at process block 451. As indicated above, the parameter index indicates which of the six parameters in the negotiation segment (FIG. 7) is being negotiated. The choice counter indicates which one of a set of negotiable parameters is being proposed.

Figure 10:
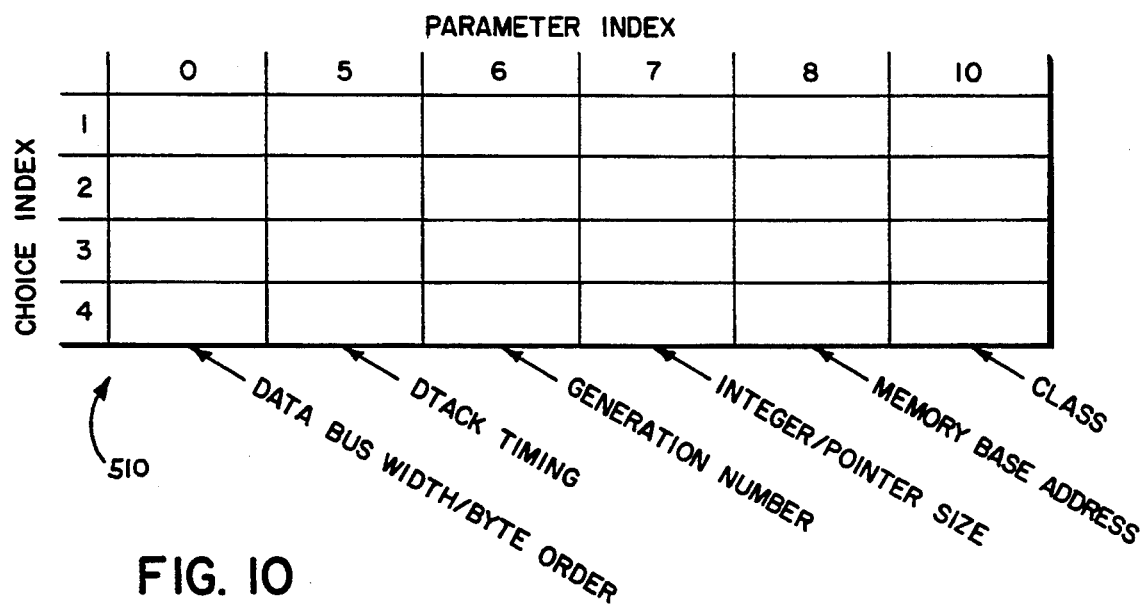
FIG. 10 is a pictorial representation of a data structure employed by the negotiation process of FIG. 9.

Using the parameter index and the choice counter, the value of the next parameter to be proposed is read from a stored table 510 as indicated at process block 452. The table 510 is shown in FIG. 10. The parameter index selects a column in this table 510, and the choice counter selects an entry in that column. Each column is a list of parameter values which are supported by the communications interface circuit in the order which they are preferred. The selected parameter value is written into the negotiation segment 350 of the shared RAM 211 as indicated at process block 453, and an interrupt of the host is requested at process block 454.

The communications interface circuit waits for the host to read the proposed value and either accept it, or make a counter proposal. When the host signals its response by interrupting the interface controller 222, the value proposed by the host is read from the shared RAM 211 as indicated at 455. If the value is the same as that proposed by the communications interface circuit, the system branches at decision block 456, or if the counter proposed value is acceptable, the system branches at decision block 462, and the parameter index is incremented at 457 to negotiate the next parameter. If the proposed value and counter proposed value are unacceptable, the system loops back to read the next parameter value from the table 510 after the choice counter is incremented at process block 463. A loop is thus established in which each parameter value is proposed, and as each parameter value is successfully negotiated, a second loop is established in which the choice counter is reset at process block 458 and the succeeding parameters are negotiated until the last parameter has been negotiated as determined at decision block 459. The parameter index is then set to "FF" (hexadecimal) at 460 and the host is again interrupted at 461 to signal the end of the negotiation process. When the host responds with an interrupt, the negotiation is completed and the process exits at 464.

The flow chart of FIG. 9 depicts a generalized negotiation program in which any number of parameters and any number of choices can be negotiated. Where the number of parameters and choices to be negotiated are few, a much simpler program can be employed. An example of such a program is illustrated by the source listing in Appendix A.

Figure 11:
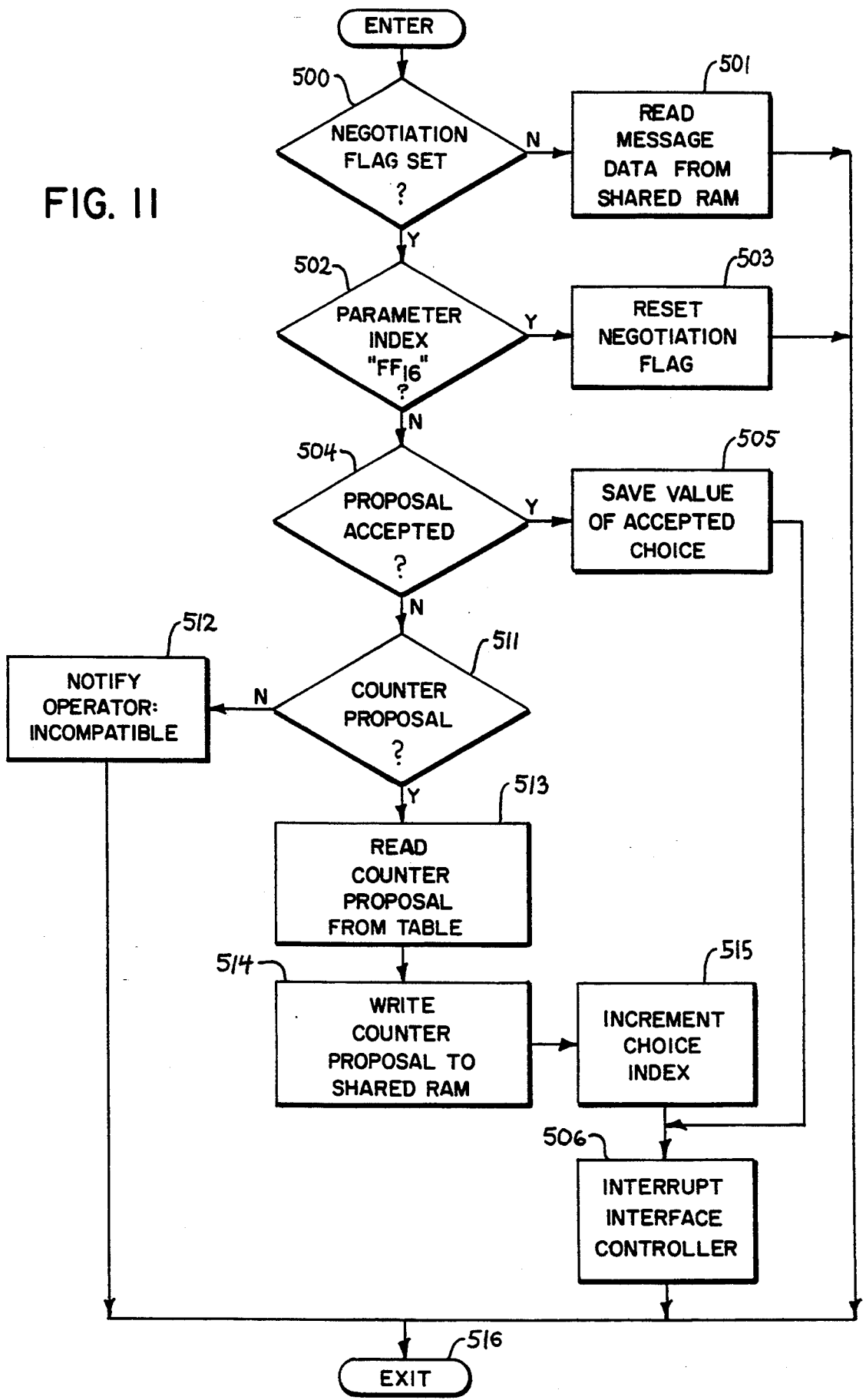
FIG. 11 is a flowchart of the negotiation process carried out by a host processor which connects to the communications interface circuit of the present invention.

The host processor responds to interrupts from the interface controller 222 by executing a program which services the interrupt. A flowchart of such an interrupt service routine is shown in FIG. 11. This is a generalized negotiation program which operates with the generalized program of FIG. 9, however, a more specific program which operates with the program in Appendix A is illustrated by the source listing in Appendix B. It should also be understood that the functions performed in this routine might also be performed by the host as a separate task rather than an interrupt service routine.

Referring to FIG. 11, when the host processor is interrupted it checks a negotiation flag to determine if the negotiation procedure is in progress. If not, as determined at decision block 500, the system branches to read message data from the shared RAM 211 as indicated at process block 501. Otherwise, the value of the parameter index is read from the shared RAM 211 to determine the stage of the negotiation. If negotiation is completed, as determined at decision block 502, the system branches and the negotiation flag is reset at process block 503. Otherwise, the value of the proposed parameter is read from the negotiation segment of the shared RAM 211 and it is compared with the parameter value preferred by the host processor at decision block 504. If the proposed value is accepted, the parameter value is saved by the host processor at 505 for later use, and an interrupt to the interface controller 222 is generated at process block 506 to signal the acceptance.

If the parameter proposed by the communications interface circuit is not accepted, a counter proposal may be made by the host processor. As with the interface controller 222, the acceptable parameter values are stored in a parameter table 510 as illustrated in FIG. 10. A choice counter serves as an index into the table 510 to select one of the possible choices for a given negotiable parameter, and the parameter index read from shared RAM 211 indicates which parameter is being negotiated and serves as an index into the proper column of this table. The format of each parameter value is described in detail above and at least the first choice for each negotiable parameter must be set to a nonzero value.

Referring again to FIG. 11, if the proposed value from the communications interface circuit is not acceptable, the host processor reads the table 510 for new values it can propose. If all the available choices have previously been proposed, the system branches at decision block 511 and an indication is made to the operator at process block 512 that the communications interface circuit is not compatible with the host processor. Otherwise, another parameter value is read from the table 510 at process block 513 and written to the proper location in the negotiation segment of the shared RAM 211 as indicated at process block 514. The choice counter is then incremented at process block 515 so that the next choice of the negotiable parameter will be proposed during the subsequent interrupt. The interface controller 222 is then interrupted at process block 506 and the host exits at 516 to carry out its other programmed tasks.

APPENDIX A

NEGOTIATE (Interface Controller)

```
;
;       Description:    This routine is designed to negotiate with the
;                       host. Just before the negotiation ends this
;                       routine initiates configuration of the dualport
;
;       Inputs:         r2, r3, r4, r5, r8, r9, r10, r11, r15 - all
;                       remain as they are set even after waiting for
;                       an interrupt from the host.
;
;       Outputs:    *   base address, byte order, dtack timing,
;                       segment class, and generation are all
;                       negotiated
:

ldw     rr10,#negotiation_segment       ; set ptr to segment
        ld      PAGEPTR,#((PAGEADR^&$FF00)^>8)  ; setup page ptr negotiate_databus_byord:

clr     r15                             ; set index
        ld      r9,#(DATA_BUS_8^|BYTEORDER_LOHI) ; set offer
        lde     1(rr10),r9                      ;
        lde     2(rr10),r9                      ;
        lde     3(rr10),r9                      ;
        lde     @rr10,r9                        ; make offer to host
        lde     PRAM_INDEX+negotiation_segment,r15 ; set index
        InterruptHost                           ; inform host offer rc
        call    hostintexit                     ; wait for reply
        lde     r8,@rr10                        ; get counter-proposal
        cp      r8,r9                           ; compare offer and
        if_eq.s                                 ; if offer accepted
            ld   BYTEORDER,#$01                 ; BYTEORDER = low-fir
        else                                    ;
            cp   r8,#(DATA_BUS_8^|BYTEORDER_HILO)
            if_eq.s                             ; if valid counter
                ld   BYTEORDER,#$02             ; BYTEORDER = high-fir
            else                                ;
                jr   negotiate_databus_byord    ; re-negotiate
            end                                 ;
        end                                     ;
        add     r11,#5                          ; update ptr to next
        adc     r10,#0                          ; parameter negotiate_dtack_timing:

ld      r9,#EARLY_DTACK                 ; set offer
        ld      r15,#DTACK_TIMING               ; set index
```

```
        lde     @rr10,r9                                        ; make offer to host
        lde     PRAM_INDEX+negotiation_segment,r15              ; set index
        InterruptHost                                           ; inform host offer rdy
        call    hostintexit                                     ; wait for reply
        lde     r8,@rr10                                        ; get counter-proposal
        cp      r8,r9                                           ; compare offer and
        if_eq.s                                                 ; if offer accepted
                lde     EarlyDtack,r8                           ; use early DTACK
        else                                                    ; otherwise
                cp      r8,#NORMAL_DTACK                        ; good counter-offer ?
                jr      ne,negotiate_dtack_timing               ; no, renegotiate
                lde     NormalDtack,r8                          ; yes, use normal DTACK
        end                                                     ;
        incw    rr10                                            ; update pointer negotiate_generation:

ld      r9,#GEN_NMBR                                    ; set offer
        ld      r15,#GENERATION_NBR                             ; set index
        lde     @rr10,r9                                        ; make offer to host
        lde     PRAM_INDEX+negotiation_segment,r15              ; set index
        InterruptHost                                           ; inform host offer rdy
        call    hostintexit                                     ; wait for reply
        lde     r8,@rr10                                        ; get counter-proposal
        cp      r8,r9                                           ; compare offer and
        jr      ne,negotiate_generation                         ; no good re-do
        incw    rr10 negotiate_segment_class:

ld      r9,#SEG_CLASS_0                                 ; set offer
        ld      r15,#CLASS_SEG_DES                              ; set index
        lde     @rr10,r9                                        ; make offer to host
        lde     PRAM_INDEX+negotiation_segment,r15              ; set index
        InterruptHost                                           ; inform host offer rdy
        call    hostintexit                                     ; wait for reply
        lde     r8,@rr10                                        ; get counter-proposal
        cp      r8,r9                                           ; compare offer and
        jr      ne,negotiate_segment_class                      ; offer no good re-do
        incw    rr10                                            ; update pointer negotiate_sizeof_dpram:

ldw     rr8,#DUALPORT_SIZE                              ; set offer
        ldb     r11,BYTEORDER,#0                                ; get long address
        ldb     r11,#1,r11                                      ; upper word set to 0
        bitc    r11,#1                                          ; get to lower word
        lde     @rr10,r8                                        ; set lower word
        bitc    r11,#0                                          ;
        lde     @rr10,r9                                        ; make offer to host
        ld      r15,#SIZEOF_DPRAM                               ; set index
        lde     PRAM_INDEX+negotiation_segment,r15              ;
        InterruptHost                                           ; inform host offer rdy
        call    hostintexit                                     ; wait for reply
        lde     r9,@rr10                                        ; read counter offer
        bitc    r11,#0                                          ; back
        lde     r8,@rr10                                        ;
        bitr    r11,#0                                          ;
        cp      r9,#(%00FF^&DUALPORT_SIZE)                      ;
        jr      ne,negotiate_sizeof_dpram                       ; virtual page
        cp      r8,#((%FF00^&DUALPORT_SIZE)^>8)                 ;
        jr      ne,negotiate_sizeof_dpram                       ; no good re-do ld      PAGEPTRL,#00                                    ; set upper 16-bits
        ld      PAGEPTRH,#00                                    ; of 32-bit address negotiate_dummy_cycle:

ld      r15,#DUMMY_CYCLE                                ; make dummy offer
        lde     PRAM_INDEX+negotiation_segment,r15              ; set index
        InterruptHost                                           ; inform host offer rdy
        call    hostintexit                                     ; wait for reply
```

APPENDIX B

NEGOTIATE (Host)

```
UWORD negotiate_params(NEGOTIATE *neg_ptr)

{

UWORD   neg_ok;                     /* state of negotiation */
UBYTE   plug_choice;                /* plug choice for a given param */
UBYTE   host_choice;                /* host choice for a given param */
ULONG   plug_size;                  /* plug choice for dualport size */
```

```
ULONG    host_size;                          /* host choice for dualport size */
UBYTE    index;                              /* value of parameter index */
UBYTE    old_index;                          /* vlue of previous index value */

UBYTE    *base_ptr;                          /* pointer to base of dualport */
UBYTE    *pi_ptr;                            /* pointer to parameter index */
UBYTE    *param_ptr;                         /* pointer to param currently being nego base_ptr = PTH(DUALPORT_OFFSET);
pi_ptr = PTH(DUALPORT_OFFSET + PARAMETER_INDEX_OFFSET);
param_ptr = PTH(DUALPORT_OFFSET);
neg_ok = TRUE;
old_index = 0xFF;

while(g_int_flag == FALSE);                  /* wait for plug to inte
g_int_flag = FALSE;                          /* reset g_int_flag */ while((index = GET_BYTE(pi_ptr)) != DUMMY_CYCLE)   /* negotiate until plug
   {
   param_ptr = base_ptr + index;             /* figure ptr to paramet
   neg_ptr->parameter_index = index;

switch (index)                            /* which parameter? */
      {
      case BUSWIDTH_ORDER_OFFSET:            /* buswidth/byteorder pa if (old_index == index)             /* was host choice unacc
            {
            neg_ptr->buswidth_byteorder = GET_BYTE(param_ptr); /* indicate what
            return(NEGOTIATE_FAILED);                 /* could not negotiate t
            }
         else
            {
            host_choice = neg_ptr->buswidth_byteorder; /* host choice for this
            plug_choice = GET_BYTE(param_ptr);         /* plug initial offering if (plug_choice != host_choice)            /* plug and host match?
               {                                       /* no, figure new param
               if ((host_choice & DATA_BUS_MASK) > (plug_choice & DATA_BUS_MASK
                  {
                  neg_ok = FALSE;
                  host_choice = (host_choice & BYTEORDER_MASK) | (plug_choice &
                  neg_ptr->buswidth_byteorder = host_choice;
                  }

PUT_BYTE(host_choice, param_ptr);   /* insert host choice */
               }
            }
         break;

case DTACKTIMING_OFFSET:                  /* dtack timing param */ if (old_index == index)                /* was host choice unacc
            {
            neg_ptr->dtack_timing = GET_BYTE(param_ptr);   /* indicate what
            return(NEGOTIATE_FAILED);                      /* could not negotiate t
            }
         else
            {
            if (host_choice != GET_BYTE(param_ptr))    /* params match? */
               PUT_BYTE(host_choice, param_ptr);       /* no, insert host choic
            }
         break;

case GENNUMBER_OFFSET:                     /* generation number par
         if (old_index == index)                 /* was host choice unacc
            {
            neg_ok = FALSE;                      /* yes, didn't get what
            neg_ptr->generation_number = GET_BYTE(param_ptr);  /* indicate what
            }
         else
            {
            host_choice = neg_ptr->generation_number;    /* host choice f
            plug_choice = GET_BYTE(param_ptr);           /* plug initial offering
            if (host_choice > plug_choice)               /* is plug capab
               {
               neg_ok = FALSE;                           /* no */
               neg_ptr->generation_number = plug_choice; /* update neg st
               }
            else if (host_choice < plug_choice)          /* should host c
               PUT_BYTE(host_choice, param_ptr);         /* insert host c
```

```
        }
    break;

case CLASSDESCRIPTOR_OFFSET:                            /* class descriptor para
    if (old_index == index)                             /* was host choice unacc
        {
        neg_ok = FALSE;                                 /* yes, didn't get what
        neg_ptr->class = GET_BYTE(param_ptr);           /* indicate what we got
        }
    else
        {
        host_choice = neg_ptr->class;                   /* host choice for this
        plug_choice = GET_BYTE(param_ptr);              /* plug initial offering
        if (host_choice > plug_choice)                  /* is plug capable of ho
            {
            neg_ok = FALSE;                             /* no */
            neg_ptr->class = plug_choice;               /* update neg struct wi
            }
        else if (host_choice < plug_choice)             /* should host choice be
            PUT_BYTE(host_choice, param_ptr);           /* insert host choice */
        }
    break;

case RAMSIZE_OFFSET:                                    /* dualport size param *
    if (old_index == index)                             /* was host choice unacc
        {
        neg_ok = FALSE;                                 /* yes, didn't get what
        neg_ptr->dualport_size = get_long_via_bytes((ULONG *)param_ptr);
        }
    else
        {
        if (neg_ptr->dualport_size != NULL)             /* should this p
            {                                           /* yes */
            host_size = neg_ptr->dualport_size;         /* host choice f
            plug_size = get_long_via_bytes((ULONG *)param_ptr);   /* plug
            if (host_size > plug_size)                  /* is plug capab
                {
                neg_ok = FALSE;                         /* no */
                neg_ptr->dualport_size = plug_size;     /* update neg st
                }
            else if (host_size < plug_size)             /* should host c
                {
                put_long_via_bytes(host_size, ((ULONG *)param_ptr));  /* inser
                }
            }
        else
            neg_ptr->dualport_size = get_long_via_bytes((ULONG *)param_ptr);
        }
    break;

default:
    return(NEGOTIATE_FAILED);                           /* could not negotiate t

} old_index = index;                                      /* setup for next cycle
generate_irq();                                         /* end cycle */
while(g_int_flag == FALSE);                             /* wait for plug to inte
g_int_flag = FALSE;                                     /* reset g_int_flag */

}   /* end while */ generate_irq();                                         /* end negotiation */

/* setup get/put function pointers */ plug_choice = neg_ptr->buswidth_byteorder & DATA_BUS_MASK;

if (plug_choice == DATA_BUS_8)                          /* 8 bit data bus to plu
    {
    get_word_fnc_ptr = get_word_via_bytes;
    get_long_fnc_ptr = get_long_via_bytes;
    get_pointer_fnc_ptr = get_pointer_via_bytes;
    put_word_fnc_ptr = put_word_via_bytes;
    put_long_fnc_ptr = put_long_via_bytes;
    put_pointer_fnc_ptr = put_pointer_via_bytes;
    }
```

```
else if (plug_choice == DATA_BUS_16)               /* 16 bit data bus to pl
{
   get_word_fnc_ptr = get_word_via_word;
   get_long_fnc_ptr = get_long_via_words;
   get_pointer_fnc_ptr = get_pointer_via_words;
   put_word_fnc_ptr = put_word_via_word;
   put_long_fnc_ptr = put_long_via_words;
   put_pointer_fnc_ptr = put_pointer_via_words;
}
else if (plug_choice == DATA_BUS_32)               /* 32 bit data bus to pl
{
   get_word_fnc_ptr = get_word_via_word;
   get_long_fnc_ptr = get_long_via_long;
   get_pointer_fnc_ptr = get_pointer_via_long;
   put_word_fnc_ptr = put_word_via_word;
   put_long_fnc_ptr = put_long_via_long;
   put_pointer_fnc_ptr = put_pointer_via_long;
} if (neg_ok != FALSE)                               /* determine return value */
   return(NEGOTIATE_AS_REQUEST);                   /* negotiated as desired */
else
   return(NEGOTIATE_NOTAS_REQUEST);                /* negotated not as desired */
}
```

We claim:

1. A communications interface circuit which comprises:
   a protocol machine coupled to a communications link and being operable to transmit and receive message data on said communications link;
   an interface controller coupled to the protocol machine and to a host processor;
   a shared memory coupled to the host processor and the interface controller for storing message data received by the protocol machine from the communications link for reading by the host processor, for storing message data received from the host processor for transmission on the communications link by the protocol machine, and for storing negotiated parameter values; and
   the interface controller includes negotiation means which is operable during start-up to automatically negotiate with the host processor each of the negotiated parameter values, the negotiation means including:
   a) means for storing a proposed parameter value in the negotiated parameter values portion of said shared memory;
   b) means for signalling the host processor to determine if the proposed parameter value is acceptable by the host processor;
   c) means for responding to a signal from the host processor by reading the value in the negotiated parameter values portion of said shared memory, comparing the value with the proposed parameter value and terminating the negotiation if the value and the proposed parameter value are equal; and
   the interface controller is operable after terminating negotiation of all of said negotiated parameter values to use the negotiated parameter values stored in the negotiated parameter values portion of said shared memory to control the exchange of message data between the shared memory and the host processor;
   the interface controller and the host processor being coupled together by interrupt control lines and the interface controller signals the host processor by interrupting operation of the host processor through an interrupt control line and the host processor signals the interface controller by interrupting operation of the interface controller through another interrupt control line, and
   the host processor responds to the interrupt from the interface controller by reading the value of the proposed parameter from the shared memory and if the proposed parameter value is not acceptable to the host processor, then the host automatically writes a new negotiated parameter value to the negotiated parameters portion of the shared memory and the host interrupts operation of the interface controller through said another interrupt control line.

2. A digital system which comprises:
   a host processor which is operable in response to a stored program to carry out specific tasks;
   a multi-bit host data bus connected to the host processor for conveying data during a host processor read cycle and a host processor write cycle;
   a communications interface circuit coupled to the multi-bit host data bus and to a communications link, the communications interface circuit being operable to transmit on the communications link message data written to the communications interface circuit by the host processor during one of said write cycles, and being operable to receive message data from the communications link which is read by the host processor during one of said read cycles;
   wherein the host processor includes negotiation means for automatically negotiating a set of parameter values, which negotiation means includes:
   a) means for reading a proposed parameter value from the communications interface circuit,
   b) means for comparing the proposed parameter value with a set of stored acceptable parameter values,
   c) means for writing one of said stored acceptable parameter values to the communications interface circuit if the proposed parameter value does not correspond to a stored acceptable parameter value, and
   d) means for signaling the communications interface circuit that the proposed parameter value has been accepted by the host processor; and
   wherein the host processor is operable after said negotiation means automatically negotiates said set of parameter values to use said parameter values to control the exchange of message data between the host processor and the communications interface circuit.

3. The digital system as recited in claim 2 in which the set of negotiable parameter values includes a value which indicates a number of bits of data conveyed to and from the communications interface circuit on the multi-bit host data bus during a read cycle and a write cycle.

4. The digital system as recited in claim 2 in which the set of negotiable parameter values includes a parameter value which indicates whether the host processor is a low order byte first architecture or a high order byte first architecture.

5. The digital system as recited in claim 2 in which the set of negotiable parameter values includes a parameter value which indicates a timing of a control signal during a read or write cycle in which data is coupled between the host processor and the communications interface circuit.

6. The digital system as recited in claim 2 in which the communications interface circuit includes:
  a protocol machine coupled to the communications link and being operable to transmit and receive message data on said communications link;
  an interface controller coupled to the protocol machine and to the host processor;
  a shared memory coupled to the multi-bit host data bus and the interface controller for storing message data received by the protocol machine from the communications link for reading by the host processor, for storing message data written thereto by the host processor for transmission on the communications link by the protocol machine, and for storing the set of negotiable parameter values; and
  the interface controller includes negotiation means which is operable during start-up to automatically negotiate with the host processor each of said negotiable parameter values, which negotiation means includes:
  e) means for storing said proposed parameter value in said shared memory,
  f) means for signaling the host processor that the proposed parameter value is to be read from said shared memory,
  g) means responsive to said signaling from the host processor for reading said acceptable parameter value from said shared memory, and comparing said acceptable parameter value with the proposed parameter value and terminating the negotiation if said acceptable parameter value and the proposed parameter value are the same.

7. The digital system as recited in claim 6 in which one of the negotiable parameter values is a value which indicates a number of data bits which are conveyed to and from the shared memory on the multi-bit host data bus during a read cycle and a write cycle.

8. The digital system as recited in claim 6 in which one of the negotiable parameter values is a value which indicates a timing of a control signal during a read or write cycle in which data is coupled between the host processor and the shared memory.

9. The digital system as recited in claim 6 in which one of the negotiable parameter values is a value which indicates whether the host processor is a lower order byte first architecture or a higher order byte first architecture.

* * * * *